(12) United States Patent
Yamakawa et al.

(10) Patent No.: US 8,324,856 B2
(45) Date of Patent: Dec. 4, 2012

(54) MOTOR DRIVE CONTROL APPARATUS, VEHICLE WITH MOTOR DRIVE CONTROL APPARATUS, AND MOTOR DRIVE CONTROL METHOD

(75) Inventors: Toshifumi Yamakawa, Okazaki (JP); Hideto Hanada, Toyota (JP); Kazuhito Hayashi, Inazawa (JP); Masayoshi Suhama, Toyota (JP); Masaki Okamura, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 299 days.

(21) Appl. No.: 12/922,763

(22) PCT Filed: Dec. 19, 2008

(86) PCT No.: PCT/JP2008/073249
§ 371 (c)(1),
(2), (4) Date: Sep. 15, 2010

(87) PCT Pub. No.: WO2009/116215
PCT Pub. Date: Sep. 24, 2009

(65) Prior Publication Data
US 2011/0006723 A1 Jan. 13, 2011

(30) Foreign Application Priority Data
Mar. 18, 2008 (JP) .................................. 2008-70100

(51) Int. Cl.
*H02P 23/00* (2006.01)
(52) U.S. Cl. ........ 318/812; 318/767; 318/766; 318/494; 318/82; 318/493; 318/720; 318/438

(58) Field of Classification Search .................. 318/812, 318/767, 766, 494, 82, 493, 720, 438
See application file for complete search history.

(56) References Cited

U.S. PATENT DOCUMENTS
6,400,107 B1 * 6/2002 Nakatani et al. ......... 318/400.21
(Continued)

FOREIGN PATENT DOCUMENTS
JP A-2004-080998 3/2004
(Continued)

OTHER PUBLICATIONS
International Preliminary Report on Patentability issued in Application No. PCT/JP2008/073249; Dated Nov. 2, 2010.
International Search Report issued in Application No. PCT/JP2008/073249; Dated Mar. 24, 2009 (With Translation).

*Primary Examiner* — Rita Leykin
(74) *Attorney, Agent, or Firm* — Oliff & Berridge, PLC

(57) ABSTRACT

In the hybrid vehicle, a boost converter is controlled to make a post-boost voltage or a voltage on the side of an inverter become a target post-boost voltage corresponding to a target operation point of a motor in accordance with a target post-boost voltage setting map that divides an operation region of the motor into a non-boost region and a boost region when a operation point of the motor is included in the boost region. The target post-boost voltage setting map is prepared so that the non-boost region includes a region in which a loss produced by driving the motor when not boosting the post-boost voltages becomes smaller than the loss produced when boosting the post-boost voltage and the boost region includes a region in which the loss produced when boosting the post-boost voltage becomes smaller than the loss produced when not boosting the post-boost voltage.

14 Claims, 12 Drawing Sheets

U.S. PATENT DOCUMENTS

| | | | |
|---|---|---|---|
| 6,741,063 B2 * | 5/2004 | Sakai et al. | 318/809 |
| 6,844,700 B2 * | 1/2005 | Sakai et al. | 318/801 |
| 7,161,323 B2 * | 1/2007 | Ajima et al. | 318/629 |
| 7,538,510 B2 * | 5/2009 | Atarashi et al. | 318/494 |
| 7,629,755 B2 * | 12/2009 | Yaguchi | 318/139 |
| 7,847,495 B2 * | 12/2010 | Oyobe et al. | 318/53 |
| 7,898,208 B2 * | 3/2011 | Ochiai et al. | 318/760 |
| 8,004,220 B2 * | 8/2011 | Sparey et al. | 318/400.22 |
| 8,120,290 B2 * | 2/2012 | King | 318/139 |

FOREIGN PATENT DOCUMENTS

| | | |
|---|---|---|
| JP | A-2004-316502 | 11/2004 |
| JP | A-2005-210772 | 8/2005 |
| JP | A-2001-202311 | 8/2007 |
| JP | A-2007-202311 | 8/2007 |
| JP | A-2007-306658 | 11/2007 |

\* cited by examiner

MOTOR DRIVE CONTROL APPARATUS, VEHICLE WITH MOTOR DRIVE CONTROL APPARATUS, AND MOTOR DRIVE CONTROL METHOD

TECHNICAL FIELD

The present invention relates to a motor drive control apparatus configured to drive and control a motor using electric power from a direct-current power source, a vehicle with the motor drive control apparatus and a motor drive control method.

BACKGROUND ART

Conventionally, there is known a motor drive apparatus including an inverter that drive a motor generator, a boost converter that boosts a voltage from a battery and supplies the inverter with the post-boost voltage, and a controller that provides the boost converter with a target boost voltage corresponding to a target operation state of the motor generator (for example, refer to Patent Document 1). The apparatus is provided with a map that previously defines a relationship between a torque command to the motor generator, a rotational speed of the motor generator, and the target boost voltage of the boost converter. The controller controls the boost converter so as to boost the voltage from the battery up to the target boost voltage derived from the map to correspond to the torque command and the rotational speed when the voltage from the battery is to be boosted.

[Patent Document 1] Japanese Patent Laid-Open No. 2007-202311

DISCLOSURE OF THE INVENTION

In the case when the relationship (map) between the torque command to the motor generator, the rotational speed of the motor generator, and the target boost voltage of the boost converter is previously defined as the above conventional motor drive apparatus, there is a necessity to consider various factors such as an induced voltage (counter-electromotive voltage) depending on the rotational speed of the motor generator, an execution or inexecution of a weak field control to make the inter-terminal voltage of the motor generator become equal to or larger than the induced voltage, losses produced by a boost operation of the boost converter, and the like in order to optimize the above relationship. However, the Patent Document 1 does not disclose how to define the relationship between the torque command, the rotational speed, and the target boost voltage.

The motor drive control apparatus, the vehicle with motor drive control apparatus, and the motor drive control method according to the present invention has a main object to appropriately boost a voltage on a side of the motor drive circuit with respect to the voltage on the side of the direct-current power source by a voltage converter so as to improve efficiency upon driving and controlling a motor, The present invention accomplishes the object mentioned above by the following configurations applied to a motor drive control apparatus, a vehicle with the motor drive control apparatus, and a motor drive control method.

A motor drive control apparatus according to the present invention is a motor drive control apparatus configured to drive and control a motor using electric power from a direct-current power source. The motor drive control apparatus includes: a motor drive circuit configured to drive the motor using a voltage form a side of the direct-current power source; a voltage converter capable of boosting a voltage on a side of the motor drive circuit with respect to the voltage on the side of the direct-current power source; a voltage control module that controls the voltage converter so as to make the voltage on the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boost region, the non-boost region including a region in which a loss produced by driving the motor when not boosting the voltage on the side of the motor drive circuit becomes smaller than the loss produced when boosting the voltage on the side of the motor drive circuit, the boost region including a region in which the loss produced when boosting the voltage on the side of the motor drive circuit becomes smaller than the loss produced when not boosting the voltage on the side of the motor drive circuit and a drive circuit control module that controls the motor drive circuit so as to make the motor operate at the target operation point.

In the motor drive control apparatus, the voltage converter is controlled to make the voltage on the side of the motor drive circuit become the target post-boost voltage that is the target value corresponding to the target operation point of the motor in accordance with the predetermined boost restriction dividing the operation region of the motor into the non-boost region and the boost region when the target operation point of the motor is included in the boost region. The boost restriction is prepared so that the non-boost region includes the region in which the loss produced by driving the motor when not boosting the voltage on the side of the motor drive circuit becomes smaller than the loss produced when boosting the voltage on the side of the motor drive circuit, and the boost region includes the region in which the loss produced when boosting the voltage on the side of the motor drive circuit becomes smaller than the loss produced when not boosting the voltage on the side of the motor drive circuit. Thus, in the motor drive control apparatus, the voltage converter basically boosts the voltage on the side of the motor drive circuit with respect to the voltage on the side of the direct-current power source when the loss produced by driving the motor when boosting the voltage on the side of the motor drive circuit becomes smaller than the loss produced when not boosting the voltage on the side of the motor drive circuit, so that the non-boost region is substantially enlarged within the operation region of the motor. Accordingly, the motor drive control apparatus optimally defines the non-boost region in which the voltage on the side of the motor drive circuit is not boosted with respect to the voltage on the side of the direct-current power source and the boost region in which the voltage on the side of the motor drive circuit is boosted with respect to the voltage on the side of the direct-current power source so that the voltage converter appropriately boosts the voltage on the side of the motor drive circuit with respect to the voltage on the side of the direct-current power source, thereby improving the efficiency upon driving and controlling the motor.

The loss produced by driving the motor may be defined as a sum of losses occurs in the motor, the motor drive circuit, and the voltage converter when the motor is driven while the voltage on the side of the motor drive circuit is not boosted with respect to the voltage on the side of the direct-current power source by the voltage converter or while the voltage on the side of the motor drive circuit is boosted with respect to the voltage on the side of the direct-current power source by the voltage converter. Thus, the non-boost region and the boost region can be optimally defined.

The boost restriction may define the target post-boost voltage based on an induced voltage at an operation point of the motor in the boost region for each of the operation points. Thus, the loss produced by driving the motor when boosting the voltage on the side of the motor drive circuit can be reduced while the motor operates in the boost region, and the voltage converter can be controlled in accordance with a change of the operation point of the motor so as to continuously change the voltage on the side of the motor drive circuit. Accordingly, it is possible to improve the efficiency when the motor is driven while boosting the voltage on the side of the motor drive circuit.

The boost restriction may divide the boost region into a plurality of equal voltage regions and define the target post-boost voltage for each of the equal voltage regions. By dividing the boost region into the plurality of equal voltage regions while considering the loss produced when the motor is driven, it is possible to improve the efficiency when the motor is driven while boosting the voltage on the side of the motor drive circuit.

The motor drive control apparatus may be capable of driving and controlling first and second motors as the motor. The boost restriction may be prepared for each of the first and second motors so as to define the target post-boost voltage for each of operation points. The voltage control module may control the voltage converter so as to make the voltage on the side of the motor drive circuit become a larger one of the target post-boost voltage corresponding the target operation point of the first motor and the target post-boost voltage corresponding the target operation point of the second motor. Thus, the target post-boost voltage can be optimally determined when the two motors are driven and controlled.

The voltage control module may control the voltage converter so as to make the voltage on the side of the motor drive circuit become a predetermined target post-boost voltage when a maximum torque line and a boost selection line cross each other while the voltage on the side of the motor drive circuit is not boosted with respect to the voltage on the side of the direct-current power source in accordance with the boost restriction. The maximum torque line may define a maximum torque obtained by driving the motor based on the voltage on the side of the motor drive circuit according to rotational speeds of the motor. The boost selection line may define a boundary between the non-boost region and the boost region. That is, the maximum torque obtained by driving the motor based on the voltage on the side of the motor drive circuit is limited when the voltage on the side of the motor drive circuit (and the voltage on the side of the direct-current power source decreases due to a decrease of an inter-terminal voltage of the direct-current power source and the like while the voltage on the side of the motor drive circuit is not boosted with respect to the voltage on the side of the direct-current power source in accordance with the boost restriction. When the voltage on the side of the motor drive circuit (and the voltage on the side of the direct-current power source) decreases as described above, the motor may output the torque corresponding to the target operation point as long as the maximum torque line defining the maximum torque obtained by driving the motor based on the voltage on the side of the motor drive circuit according to rotational speeds of the motor is completely included in the boost region even if the voltage on the side of the motor drive circuit is not boosted. However, when an output of the torque larger than the maximum torque is demanded while not boosting the voltage on the side of the motor drive circuit, the demand may not be satisfied if at least part of the maximum torque line is included in the non-boost region. In consideration of this, the voltage converter of the motor drive control apparatus is controlled so that the voltage on the side of the motor drive circuit becomes the predetermined target post-boost voltage when the maximum torque line and the boost selection line cross each other while the voltage on the side of the motor drive circuit is not boosted in accordance with the boost restriction. Thus, the voltage on the side of the motor drive circuit is boosted so as to increase the torque obtainable from the motor and satisfy the demand for the output of the torque when the output of the torque larger than the maximum torque is demanded while not boosting the voltage on the side of the motor drive circuit.

The motor drive control apparatus may further include a second boost restriction that defines a boost selection line defining a boundary between the non-boost region and the boost region to be on a low rotational speed side and a low torque side in comparison with the boost restriction. The voltage control module may control the voltage converter so as to make the voltage on the side of the motor drive circuit become the target post-boost voltage corresponding to the target operation point of the motor in accordance with the second boost restriction if the target operation point of the motor is included in the boost region in the second boost restriction when the maximum torque line and the boost selection line cross each other while the voltage on the side of the motor drive circuit is not boosted with respect to the voltage on the side of the direct-current power source in accordance with the boost restriction. The maximum torque line may define a maximum torque obtained by driving the motor based on the voltage on the side of the motor drive circuit according to rotational speeds of the motor. In the case of providing the second boost restriction that tends to frequently use the boost of the voltage on the side of the motor drive circuit in comparison with the above boost restriction for the motor drive control apparatus, the second boost restriction may be used when the maximum torque line and the boost selection line cross each other. Thus, the voltage on the side of the motor drive circuit is boosted so as to increase the torque obtainable from the motor and satisfy the demand for the output of a larger torque when the output of the torque larger than the maximum torque is demanded while not boosting the voltage on the side of the motor drive circuit.

The voltage control module may control the voltage converter so as to make the voltage on the side of the motor drive circuit become a predetermined target post-boost voltage when a maximum torque obtained by driving the motor based on the voltage on the side of the motor drive circuit at a present rotational speed is smaller than a torque corresponding to the present rotational speed on a boost selection line while the voltage on the side of the motor drive circuit is not boosted with respect to the voltage on the side of the direct-current power source in accordance with the boost restriction. The boost selection line may define a boundary between the non-boost region and the boost region. When the output of the torque larger than the maximum torque is demanded while not boosting the voltage on the side of the motor drive circuit, the demand may not be satisfied if the maximum torque obtained by driving the motor based on the voltage on the side of the motor drive circuit at the present rotational speed becomes smaller than the torque corresponding to the present rotational speed on the boost selection line. Thus, the voltage converter is controlled to make the voltage on the side of the motor drive circuit become the predetermined target post-boost voltage when the maximum torque is smaller than the torque corresponding to the present rotational speed on the boost selection line while the voltage on the side of the motor drive circuit is not boosted. Accordingly, the voltage on the side of the motor drive circuit is boosted so as to increase the torque obtainable from the motor and satisfy the demand for the output of the torque. Further, by comparing the maximum torque based on the present rotational speed of the motor with the torque on the boost selection line, the state in which the voltage on the side of the motor drive circuit is boosted for all that the operation point of the motor is included in the non-boost region can be reduced as long as possible, thereby improving the efficiency upon driving and controlling the motor.

The voltage control module may control the voltage converter so as to make the voltage on the side of the motor drive circuit become a predetermined target post-boost voltage when a torque of the motor in a next target operation point is larger than a maximum torque obtained by driving the motor based on the voltage on the side of the motor drive circuit at a rotational speed in the next target operation point while the voltage on the side of the motor drive circuit is not boosted with respect to the voltage on the side of the direct-current power source in accordance with the boost restriction. The next target operation point may be estimated based on a present target operation point and a last target operation point of the motor. By estimating the next target operation point based on the present target operation point and the last target operation point of the motor and determining whether or not the voltage on the side of the motor drive circuit is boosted for all that the operation point of the motor is included in the non-boost region, the state in which the voltage on the side of the motor drive circuit is boosted for all that the operation point of the motor is included in the non-boost region can be further reduced.

The target operation point may be defined by a present rotational speed of the motor and a torque command to the motor. The voltage control module may control the voltage converter so as to make the voltage on the side of the motor drive circuit become a predetermined target post-boost voltage when the torque command to the motor reaches a maximum torque obtained by driving the motor based on the voltage on the side of the motor drive circuit at the present rotational speed while the voltage on the side of the motor drive circuit is not boosted with respect to the voltage on the side of the direct-current power source in accordance with the boost restriction. Thus, the motor can be reliably operated at the target operation point even if the voltage on the side of the motor drive circuit (and the voltage on the side of the direct-current power source) decreases when the operation point of the motor is included in the non-boost region.

The target operation point may be defined by a present rotational speed of the motor and a torque command to the motor. The voltage control module may control the voltage converter so as to make the voltage on the side of the motor drive circuit become a predetermined target post-boost voltage when the torque command to the motor reaches a maximum torque obtained by driving the motor based on an inter-terminal voltage of the direct-current power source at the present rotational speed while the voltage on the side of the motor drive circuit is not boosted with respect to the voltage on the side of the direct-current power source in accordance with the boost restriction. By obtaining the maximum torque based on the inter-terminal voltage of the direct-current power source, the motor can be reliably operated at the target operation point even it the inter-terminal voltage of the direct-current power source and the voltage on the side of the motor drive circuit (and the voltage on the side of the direct-current power source) decrease when the operation point of the motor is included in the non-boost region.

The drive circuit control module may be configured to control the motor drive circuit so as to make the motor operate at the target operation point selectively using sine-wave PWM control mode with a sine-wave PWM voltage, overmodulation PWM control mode with a overmodulation PWM voltage, and rectangular-wave control mode with a rectangular-wave voltage when the voltage on the side of the motor drive circuit is not boosted with respect to the voltage on the side of the direct-current power source by the voltage converter and when the voltage on the side of the motor drive circuit is boosted with respect to the voltage on the side of the direct-current power source by the voltage converter. The rectangular-wave control mode is typically used only when the voltage converter boosts the voltage on the side of the motor drive circuit with respect to the voltage on the side of the direct-current power source. However, by extending the scope of application of the rectangular-wave control mode to the non-boost time of the voltage on the side of the motor drive circuit, the output of the motor can be secured even if reducing the state in which the voltage on the side of the motor drive circuit is boosted by the voltage converter, thereby improving the efficiency upon driving and controlling the motor.

The drive circuit control module may control the motor drive circuit using a control mode decided from at least one of the target operation point of the motor and a modulation factor of a voltage conversion by the motor drive circuit and a predetermined control mode setting restriction that defines a relationship between at least one of the target operation point and the modulation factor and the control mode of the motor drive circuit. Thus, the sine-wave PWM voltage, the overmodulation PWM control mode and the rectangular-wave control mode can be optimally and selectively used.

A Vehicle according to the present invention is a vehicle capable of being driven by power from a motor. The vehicle includes: a direct-current power source; a motor drive circuit configured to drive the motor using a voltage form a side of the direct-current power source; a voltage converter capable of boosting a voltage on a side of the motor drive circuit with respect to the voltage on the side of the direct-current power source; a voltage control module that controls the voltage converter so as to make the voltage On the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boast region, the non-boost region including a region in which a loss produced by driving the motor when not boosting the voltage on the side of the motor drive circuit becomes smaller than the loss produced when boosting the voltage on the side of the motor drive circuit, the boost region including a region in which the loss produced when boosting the voltage on the side of the motor drive circuit becomes smaller than the loss produced when not boosting the voltage on the side of the motor drive circuit; and a drive circuit control module that controls the motor drive circuit so as to make the motor operate at the target operation point.

The vehicle optimally defines the non-boost region in which the voltage on the side of the motor drive circuit is not boosted with respect to the voltage on the side of the direct-current power source and the boost region in which the voltage on the side of the motor drive circuit is boosted with respect to the voltage on the side of the direct-current power source so that the voltage converter appropriately boosts the voltage on the side of the motor drive circuit with respect to the voltage on the side of the direct-current power source, thereby improving the efficiency upon driving and controlling the motor.

A motor drive control method according to the present invention is a motor drive control method to drive and control a motor using electric power from a direct-current power source. The method uses a motor drive circuit configured to drive the motor using a voltage form a side of the direct-current power source, and a voltage converter capable of boosting a voltage on a side of the motor drive circuit with respect to the voltage on the side of the direct-current power source. The method includes the step of (a) controlling the voltage converter so as to make the voltage on the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boost region, the non-boost region including a region in which a loss produced by driving the motor when not boosting the voltage on the side of the motor drive circuit becomes smaller than the loss produced when boosting the voltage on the side of the motor drive circuit, and the boost region including a region in which the loss produced when boosting the voltage on the side of the motor drive circuit becomes smaller than the loss produced when not boosting the voltage on the side of the motor drive circuit.

The method optimally defines the non-boost region in which the voltage on the side of the motor drive circuit is not boosted with respect to the voltage on the side of the direct-current power source and the boost region in which the voltage on the side of the motor drive circuit is boosted with respect to the voltage on the side of the direct-current power source so that the voltage converter appropriately boosts the voltage on the side of the motor drive circuit with respect to the voltage on the side of the direct-current power source, thereby improving the efficiency upon driving and controlling the motor.

BEST MODE FOR CARRYING OUT THE INVENTION

Now, the best mode for carrying out the present invention will be described with reference to an embodiment.

Figure 1:
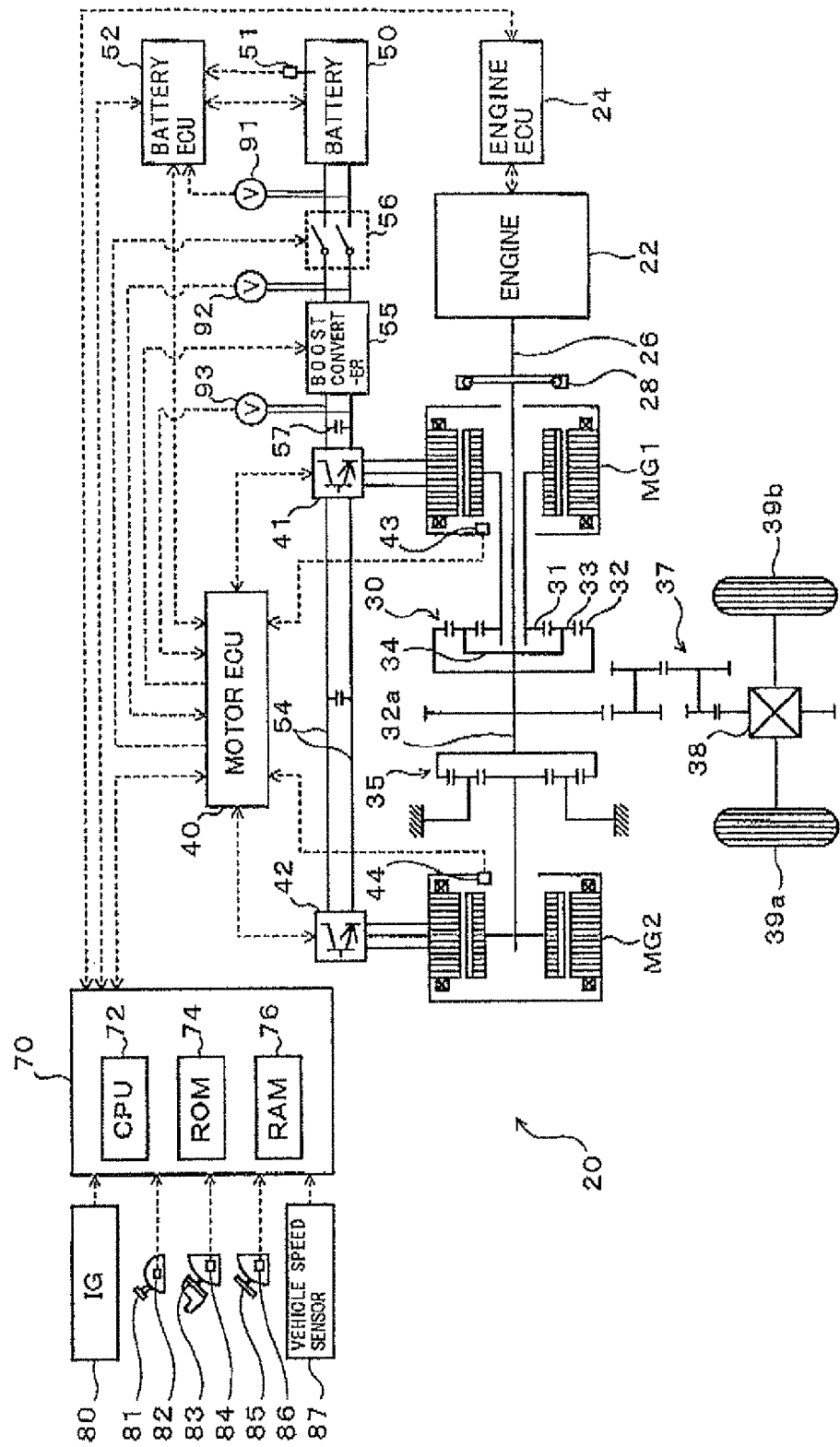
FIG. 1 is a schematic block diagram of a hybrid vehicle 20 according to an embodiment of the present invention.
Figure 2:
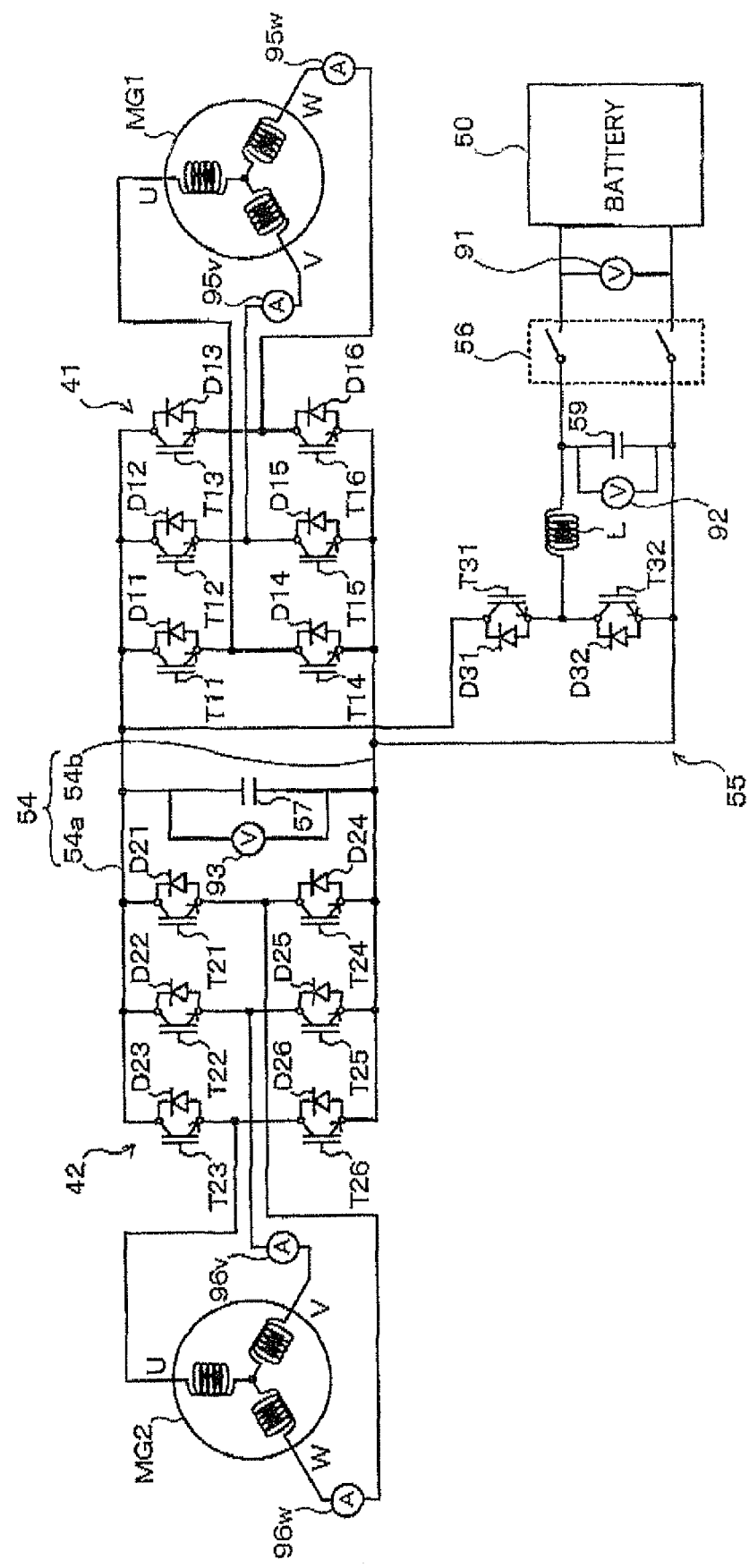
FIG. 2 is a schematic block diagram of an electric drive system including motors MG1 and MG2.

FIG. 1 is a schematic block diagram of a hybrid vehicle 20 according to an embodiment of the present invention, and FIG. 2 is a schematic block diagram of an electric drive system included in the hybrid vehicle 20. As shown in these drawings, the hybrid vehicle 20 of the embodiment includes an engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 connected to a ring gear shaft 32a or an axle connected to the power distribution integration mechanism 30, a motor MG2 connected to the ring gear shaft 32a via the reduction gear 35, inverters 41 and 42 that convert an direct-current electric power into an alternating-Current electric power and supply the alternating-current electric power with the motors MG1 or MG2, a boost converter 55 that converts a voltage of electric power from a battery 50 and supplies the converted voltage to the inverters 41 and 42, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generating power. The engine 22 is under operation controls, such as fuel injection control, ignition timing control, and intake air flow control, of an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in response to control signals from the hybrid ECU 70 and with reference to the diverse signals from the various sensors and to output data regarding the operating conditions of the engine 22 to the hybrid ECU 70 according to the requirements.

The power distribution integration mechanism 30 includes a sun gear 31 or an external gear, a ring gear 32 or an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 or the rotational elements of differential motions. The carrier 34 or an engine-side rotational element, the sun gear 31, and the ring gear 32 or an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as synchronous generator motors having a rotor with permanent magnets embedded therein and a stator with three-phase coils wounded thereon. The motors MG1 and MG2 receive and supply electric power to the battery 50 as a direct-current power source via the inverters 41 and 42. As shown in FIG. 2, the inverters 41 and 42 includes six transistors T11-T16 or T21-T26 and six diodes D11-D16 or D21-D26 arranged in parallel with but in an opposite direction to the corresponding transistors T11-T16 or T21-T26. The transistors T11-T16 and T21-T26 are arranged in pairs such that two transistors in each pair respectively function as a source and a sink to a common positive bus 54a and a common negative bus 54b shared as power lines 54 by the inverters 41 and 42. The individual phases of the three-phase coils (U phase, V phase, and W phase) in each of the motors MG1 and MG2 are connected to respective connection points of the three paired transistors controlling the rate of an on-time of the paired transistors T11-T16 or T21-T26 in the state of voltage application between the positive bus 54a and the negative bus 54b results in generating a revolving magnetic field on the three-phase coils to drive and rotate the motor MG1 or the motor MG2. The inverters 41 and 42 share the positive bus 54a and the negative bus 54b as described above. Such connection enables electric power generated by one of the motors MG1 and MG2 to be consumed by the other motor MG2 or MG1. A smoothing capacitor 57 is connected between the positive bus 54a and the negative bus 54b to smooth the voltage.

The boost converter 55 is connected with the battery 50 via a system main, relay 56 and includes a transistor T31 (upper arm) and a transistor T32 (lower arm), two diodes D31 and D32 arranged in parallel with but in an opposite direction to the two transistors T31 and T32, and a reactor L as shown in FIG. 2. The two transistors T31 and T32 are respectively connected to the positive bus 54a and the negative bus 54b of the inverters 41 and 42, and the reactor L is connected at a connection point of the two transistors T31 and T32. A positive terminal and a negative terminal of the battery 50 are respectively connected via the system main relay 56 to the reactor L and to the negative bus 54b. A smoothing capacitor 59 is also connected between the reactor L and the negative bus 54b to smooth the voltage on the side of the battery 50 of the boost converter 55. A second voltage sensor 92 is disposed between terminals of the smoothing capacitor 59. A pre-boost voltage VL (voltage on the side of the direct-current power source) of the boost converter 55 is obtained from a detection result of the second voltage sensor 92. By controlling the switching of the transistors T31 and T32, the voltage on the side of the inverters 41 and 42 can be boosted with respect to the voltage on the side of the battery 50 (pre-boost voltage VL). A post-boost voltage VH (voltage on the side of the motor drive circuit) from the boost converter 55 to be supplied to the inverters 41 and 42 is obtained from a detection result of a third voltage sensor 93 disposed between terminals of the smoothing capacitor 57. Also, by controlling the switching of the transistors T31 and T32 of the boost converter 55, the direct-current voltage applied to the positive bus 54a and the negative bus 54b can be stepped down to charge the battery 50.

The inverters 41 and 42 and the boost converter 55 are controlled by a motor electronic control unit 40 (hereinafter referred to as 'motor ECU') to drive and control the motors MG1 and MG2. The motor ECU 40 inputs various signals required for driving and controlling the motors MG1 and MG2, for example, signals representing rotational positions of rotors of the motors MG1 and MG2 from rotational position detection sensors 43 and 44, signals representing the pre-boost voltage VL from the second voltage sensor 92 and the post-boost voltage VH from the third voltage sensor 93, and signals representing phase currents to be applied to the motors MG1 and MG2 from current sensors 95v, 95w, 96v, and 96w (see FIG. 2). The motor ECU 40 outputs switching control signals to the inverters 41 and 42, a driving signal to the system main relay 56, and a switching control signal to the boost converter 55. The motor ECU 40 establishes communication with a battery electronic control unit 52 and the hybrid ECU 70 to drive and control the motors MG1 and MG2 in accordance with control signals received from the hybrid ECU 70 and signals received from the battery ECU 52 with reference to the signals from the sensors. The motor ECU 40 computes and obtains data regarding the operating conditions of the motors MG1 and MG2, for example, computing rotational speeds Nm1 and Nm2 of the motors MG1 and MG2 from the signals of the rotational position detection sensors 43 and 44, and outputs the computed and obtained data to the hybrid ECU 70 or other relevant elements according to the requirements The battery 50, a nickel hydrogen battery or a lithium ion battery in the embodiment, is managed by the battery electronic control unit 52 (hereinafter referred to as battery ECU). The battery ECU 52 inputs various signals required for managing the battery 50, for example, an inter-terminal voltage VB from a first voltage sensor 91 disposed between terminals of the battery 50, a charge-discharge current from a current sensor (not shown) disposed in the power line 54 connecting with the output terminal of the battery 50, and a battery temperature Tb from a temperature sensor 51 attached to the battery 50. The battery ECU 52 outputs data regarding the operating conditions of the battery 50 by communication to the hybrid ECU 70 and the engine ECU 24 according to the requirements. The battery ECU 52 also performs various arithmetic operations for management and control of the battery 50. A remaining charge or state of charge SOC of the battery 50 is calculated from an integrated value of the charge-discharge current measured by the current sensor. A charge-discharge power demand Pb* of the battery 50 is set based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid ECU 70 is constructed as a microprocessor including a CPU 72, a ROM 74 configured to store processing programs, a RAM 76 configured to temporarily store data, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount of an accelerator pedal 83 from an accelerator pedal position sensor 84, a brake pedal stroke BS or the driver's depression amount of a brake pedal 85 from a brake pedal stroke sensor 86, and a vehicle speed V from a vehicle speed sensor 87. As described above, the hybrid ECU 70 is connected via the communication port with the engine ECU 24, the motor ECU 40, the battery ECU 52, and the like, and exchanges various control signals and data with the engine ECU 24, the motor ECU 40, the battery ECU 52, and the like.

During a drive of the hybrid vehicle 20, the hybrid ECU 70 computes a torque demand Tr* to be output to the ring gear shaft 32a or the axle in accordance with the vehicle speed V and the accelerator opening Acc corresponding to the driver's depression amount of the accelerator pedal 83, and sets a target rotational speed Ne* and a target torque Te* of the engine 22, a torque command Tm1* or a target torque of the motor MG1, and a torque command Tm2* or a target torque of the motor MG2 so as to ensure output of a torque equivalent to the computed torque demand Tr* to the ring gear shaft 32a. The hybrid vehicle 20 of the embodiment has several drive control modes of the engine 22 and the motors MG1 and MG2 including a torque conversion drive mode, a charge-discharge drive mode, and a motor drive mode. In the torque conversion drive mode, the hybrid ECU 70 sets the target rotational speed Ne* and the target torque Te* of the engine 22 so as to ensure output of a power from the engine 22 that is equivalent to the torque demand Tr*, while setting the torque commands Tm1* and Tm2* of the motors MG1 and MG2 to enable all the output power of the engine 22 to be subjected to torque conversion by the power distribution integration mechanism 30 and the motors MG1 and MG2 and to be output to the ring gear shaft 32a. In the charge-discharge drive mode, the hybrid ECU 70 sets the target rotational speed Ne* and the target torque Te* of the engine 22 so as to ensure output of a power from the engine 22 that is equivalent to the sum of the torque demand Tr* and a charge-discharge power demand Pb* to be charged or discharged from the battery 50, while setting the torque commands Tm1* and Tm2* of the motors MG1 and MG2 to enable all or part of the output power of the engine 22 with charge or discharge of the battery 50 to be subjected to torque conversion by the power distribution integration mechanism 30 and the motors MG1 and MG2 and to ensure output of a torque equivalent to the torque demand Tr* to the ring gear shaft 32a. In the hybrid vehicle 20 of the embodiment, an intermittent operation of the engine 22 is automatically performed when predetermined conditions are satisfied in the torque conversion drive mode and the charge-discharge drive mode. In the motor drive mode, the hybrid ECU 70 stops the operation of the engine 22 and controls the motor MG2 to output a torque equivalent to the torque demand Tr* to the ring gear shaft 32a. In this case, the hybrid ECU 70 sets 0 to the target rotational speed Ne* and the target torque Te* of the engine 22 and the torque command Tm1* of the motor MG1 and sets the torque command Tm2* of the motor MG2 based on the torque demand Tr*, a gear ratio ρ of the power distribution integration mechanism 30, and a gear ratio Gr of the reduction gear 35. When the engine 22 is started in response to a start demand of the engine 22 during a stop or the drive of the hybrid vehicle 20 in the motor drive mode, the hybrid ECU 70 sets the torque command Tm1* and Tm2* of the motors MG1 and MG2 so as to make the motor MG1 crank the engine 22 and cancel a reaction torque with respect to a drive torque that acts on the ring gear shaft 32a while cranking the engine 22 and ensure a torque equivalent to the torque command Tr* on the ring gear shaft 32a. In order to prevent vibration due to torque ripple arising in the crankshaft 25 during the cranking of the engine 22 from being transmitted to the ring gear shaft 32a or the axle, a vibration control is performed so as to make the motor MG1 output a vibration control torque having opposite phase to the torque ripple and acquired through experiments and analyses and make the motor MG2 output a torque for canceling the torque ripple transmitted to the ring gear shaft 32a.

After setting the target rotational speed Ne* and the target torque Te* of the engine 22 and the torque commands Tm1* and Tm2* of the motors MG1 and MG2, the hybrid ECU 70 sends the target rotational speed Ne* and the target torque Te* of the engine 22 to the engine ECU 24 and the torque commands Tm1* and Tm2* of the motors MG1 and MG2 to the motor ECU 40. The engine ECU 24 controls the engine 22 to operate at an operation point defined by the target rotational speed Ne* and the target torque Te* received from the hybrid ECU 70. The motor ECU 40 controls the switching of the inverters 41 and 42 to respectively drive the motor MG1 and the motor MG2 with the torque command Tm1* and with the torque command Tm2* received from the hybrid ECU 70. In the embodiment, the motor ECU 40 adopts one of three control modes for controlling the switching of the inverters 41 and 42, sine-wave PWM control mode with a sine-wave PWM voltage, overmodulation PWM control mode with an overmodulation PWM voltage, and rectangular-wave control mode with a rectangular-wave voltage, in accordance with the torque commands Tm1* and Tm2* and the rotational speeds Nm1 and Nm2 of the motors MG1 and MG2. The sine-wave PWM control made is generally referred to as 'PWM control' and controls on and off the transistors T11-T16 and the transistors T21-T26 in accordance with a voltage difference between a voltage command value in a sinusoidal waveform and a voltage of a triangular wave or another carrier wave to obtain an output voltage (PWM voltage) having a sinusoidal fundamental wave component. In the sine-wave PWM control mode, a modulation factor Kmd as a ratio of the output voltage (the amplitude of the fundamental wave component) to the post-boost voltage VH (inverter input voltage) supplied from the boost converter 55 (the smoothing capacitor 57) is set approximately in a range of 0 to 0.61. The overmodulation PWM control mode distorts the carrier wave to reduce the amplitude of the carrier wave and then performs the control of the sine-wave PWM control. In the overmodulation PWM control mode, the modulation factor Kmd is set approximately in a range of 0.61 to 0.78. The rectangular-wave control mode theoretically generates a fundamental wave component having a maximum amplitude and controls the motor torque by varying the phase of a rectangular voltage having a fixed amplitude according to the torque command. In the rectangular-wave control mode, the modulation factor Kmd is kept at a substantially constant value (approximately equal to 0.78). The control accuracy (control response) of the inverters 41 and 42 (the motors MG1 and MG2) decreases in the sequence of the sine-wave PWM control, the overmodulation PWM control, and the rectangular-wave control. The rectangular-wave control enhances the voltage utilization of the direct-current power source and prevents a copper loss and a switching loss to improve the energy efficiency. In a high-speed rotation zone with the high rotational speeds of the motors MG1 and MG2, the rectangular-wave control is basically adopted for the switching control. In this case, a weak field control is performed to supply field weakening current and make the post-boost voltage VH, which is to be supplied to the inverters 41 and 42, higher than an induced voltage generated in the motors MG1 and MG2. In the hybrid vehicle 20 of the embodiment, the motor ECU 40 controls the boost converter 55 to boost a rated voltage of the battery 50 (for example, DC 150V) to a predetermined voltage level (for example, 650 V at the maximum) according to a target operation point of the motor MG1 or MG2 (defined by present torque commands Tm1*, Tm2* and the rotational speeds Nm1, Nm2).

Next, a control procedure of the boost converter 55 and a setting procedure of the control mode of the inverters 41 and 42 (motor MG1 and MG2) in the hybrid vehicle 20 of the embodiment will be described.

Figure 3:
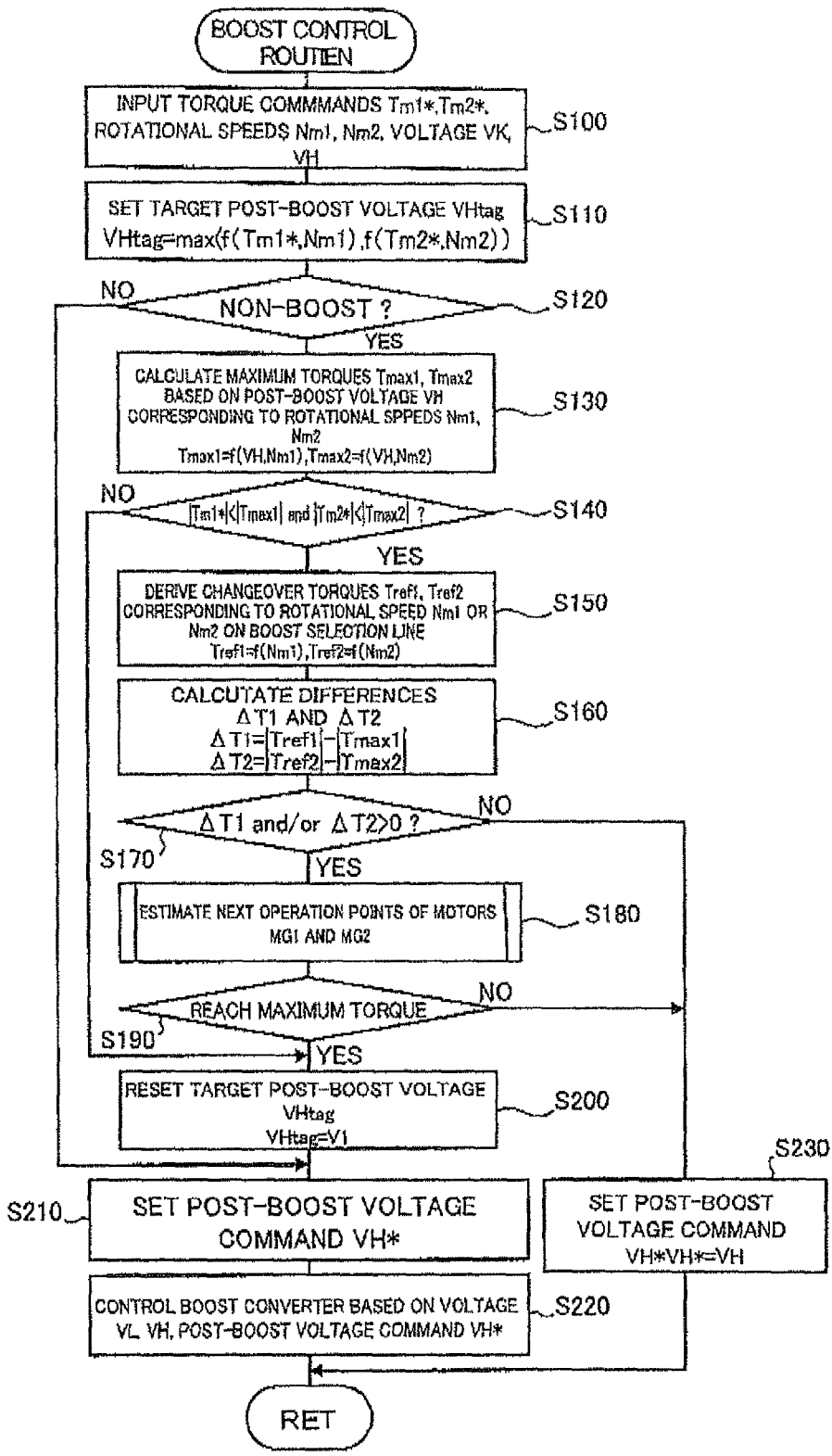
FIG. 3 is a flowchart illustrating an example of a boost control routine executed by a motor ECU 40 of the embodiment.

FIG. 3 is a flowchart illustrating an example of a boost control routine executed by the motor ECU 40 of the embodiment at preset time intervals. At a start of the boost control routine of FIG. 3, a CPU not shown) of the motor ECU 40 executes an input process of data required for control such as the torque commands Tm1* and Tm2* to the motors MG1 and MG2 from the hybrid ECU 70, present rotational speeds Nm1 and Nm2 of the motors MG1 and MG2, the pre-boosted voltage VL, the post-boosted voltage VH and the like (Step S100). After the data input at Step S100, the CPU sets a target post-boost voltage VHtag as a target value of the post-boost voltage VH according to the driving condition of the hybrid vehicle 20 using the torque commands Tm1* and Tm2* of the motors MG1 and MG2, the current rotational speeds Nm1 and Nm2 of the motors MG1 and MG2, and target post-boost voltage setting maps (boost restrictions) that are previously prepared for the motors MG1 and MG2 and stored in a memory (not shown) of the motor ECU 40 (Step S110). In the embodiment, the target post-boost voltage VHtag is set to a larger one of a value that corresponds to the target operation point of the motor MG1 (the present rotational speed Nm1 and the torque command Tm1*) and is derived from the target post-boost voltage setting map for the motor MG1 and a value that corresponds to the target operation point of the motor MG2 (the present rotational speed Nm2 and the torque command Tm2*) and is derived from the target post-boost voltage setting map for the motor MG2.

Figure 4:
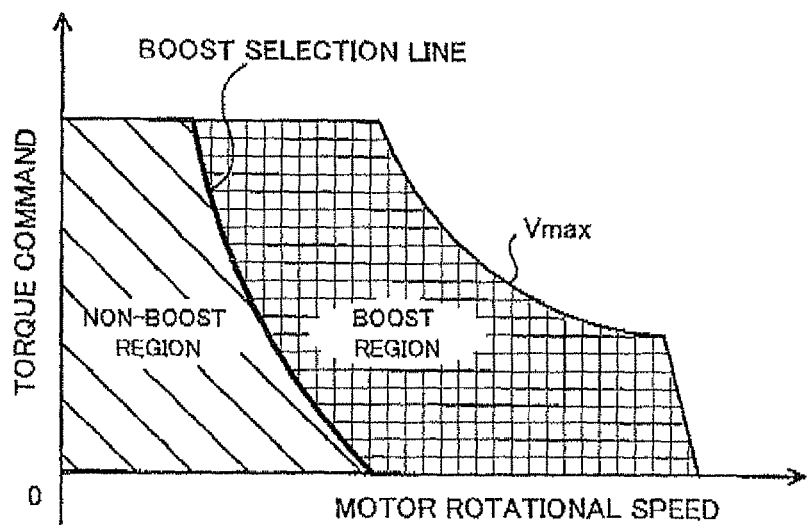
FIG. 4 is an explanatory view exemplifying a target post-boost voltage setting map.
Figure 5:
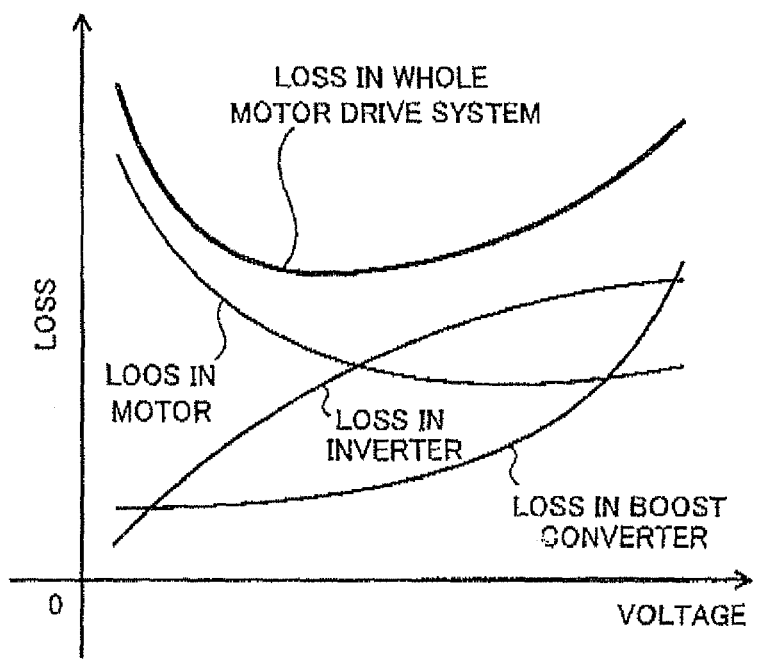
FIG. 5 is an explanatory view exemplifying a characteristic of a loss of the motor drive system.

FIG. 4 shows one example of the target post-boost voltage setting map. This drawing exemplifies a first quadrant of the target post-boost voltage setting map, that is, an area having positive values for both the motor torque command and the motor rotational speed. As seen from FIG. 4, the target post-boost voltage setting map is prepared to respectively divide operation region of the motor MG1 or the motor MG2 into a non-boost region where the post-boost voltage VH is not boosted with respect to the pre-boost voltage VL by the boost converter 55 and a boost region where the post-boost voltage VH is boosted with respect to pre-boost voltage VL by the boost converter 55. For example, the target post-boost voltage setting map for the motor MG2 is prepared in accordance with following processes the embodiment. At first, an essential region where a boost of the post-boost voltage VH is absolutely required to make the motor MG2 output a torque equivalent to the torque command Tm2* is defined in the operation region of the motor MG2. Next, a loss of the whole of the electric drive system that corresponds to a sum of losses in the motors MG1 and MG2, losses in inverters 41 and 42, and a loss in the boost converter 55 (see FIG. 5) is compared between when the post-boost voltage WI is not boosted with respect to the pre-boost voltage VL by the boost converter 55 and when the post-boost voltage VH is boosted with respect to the pre-boost voltage VL by the boost converter 55 for each of the operation points (rotational speed and torque command) included in a region other than the essential region. Then, the target post-boost voltage setting map for the motor MG2 is obtained by assigning an operation point where the loss of the whole of the electric drive system become small when not boosting the post-boost voltage in comparison with when boosting the post-boost voltage to the non-boost region and assigning an operation point where the loss of the whole of the electric drive system become small when boosting the post-boost voltage in comparison with when not boosting the post-boost voltage to the boost region. The target post-boost voltage setting map for the motor MG1 is also prepared by the above described processes. Thus, a boost selection line or a bold solid line shown in FIG. 4 defines the region with lower absolute values of the motor rotational speeds as the non-boost region and defines the region with higher absolute values of the motor rotational speeds (including the boost selection line) as the boost region when illustrating the target post-boost voltage setting maps for the motors MG1 and MG2. Here, the loss in the boost converter 55 can be obtained from an energy difference between the motors MG1 and MG2, the inter-terminal voltage VB of the battery 50, or from a battery current estimated from a voltage applied to the reactor L of the boost converter 55 and the post-boost voltage VH. The target post-boost voltage setting maps for the motors MG1 and MG2 of the embodiment are also prepared so as to reduce the loss of the electric drive system as much as possible for each operation point of the motor MG1 or MG2 in the boost region and define the target post-boost voltage VHtag that is a target value of the post-boost voltage VH capable of canceling the induce voltage in each operation point. In the non-boost region, the target post-boost voltage VHtag is set to a constant value smaller than the value of the target post-boost voltage VHtag in the boost region, for example, a rated voltage of the battery 50. The boost selection line used when shifting from the non-boost region to the boost region may be same as the boost selection line used when shifting from the boost region to the non-boost region. Hysteresis may be incorporate between the boost selection line used when shifting from the non-boost region to the boost region and the boost selection line used when shifting from the boost region to the non-boost region so that a shift from the boost region to the non-boost region is performed in a region with lower motor rotational speeds in comparison with a shift from the boost region to the non-boost region.

After the process of Step S110, the CPU compares the set target post-boost voltage VHtag and the pre-boost voltage VL input at Step S100 for example so as to determine whether or not the post-boost voltage VH is boosted with respect to the pre-boost voltage VL in accordance with the target post-boost voltage setting maps (Step S120). When the post-boost voltage VH is to be boosted, the CPU sets a post-boost voltage command VH* to a smaller one of the target post-boost voltage VHtag set at Step S110 and a value that is a sum of the post-boost voltage command VH* in a last execution of the routine and a predetermined boost rate ΔV (Step S210). The boost rate ΔV is a change amount of the voltage within a unit interval (execution interval of the routine) when the post-boost voltage VH is boosted up to the target post-boost voltage VHtag. The boost rate ΔV may be a constant value or a variable. Then, the CPU controls the switching of the transistors T31 and T32 of the boost converter 55 in accordance with the set post-boost voltage command VH*, the pre-boost voltage VL and the post-boost voltage VH input at Step S100 so as to make the post-boost voltage VH become the post-boost voltage command VH* (Step S220), and returns to Step S100 to repeat the processes of and after Step S100.

Figure 6:
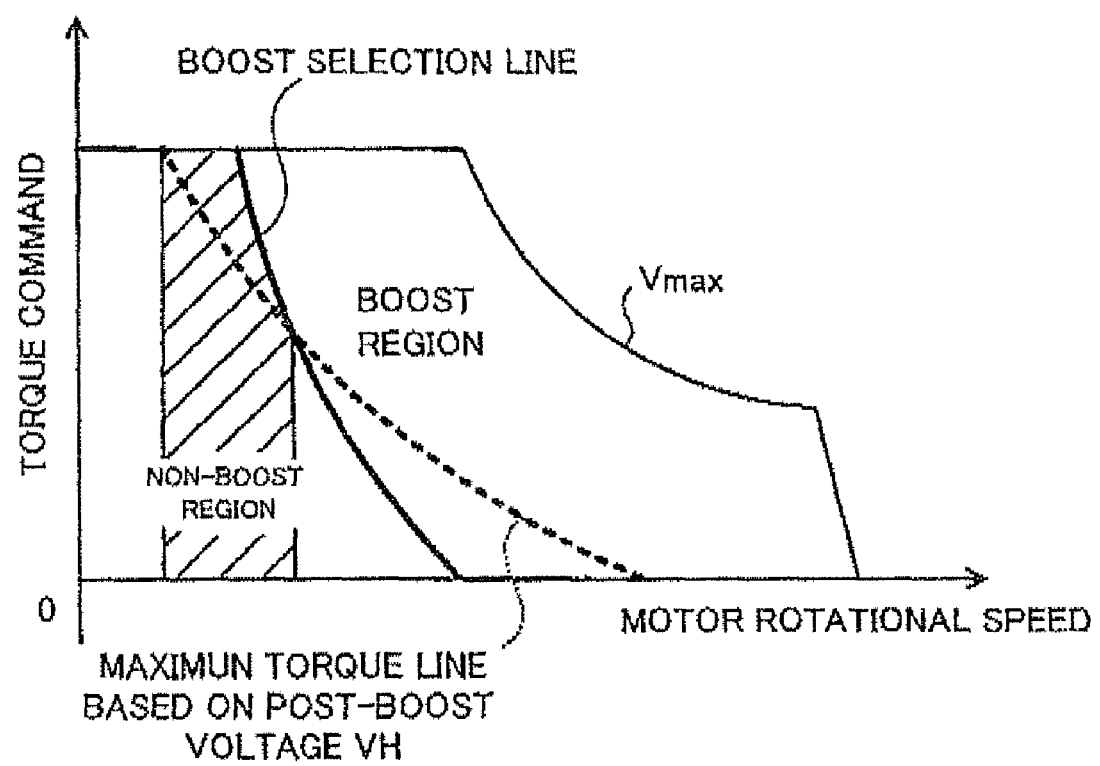
FIG. 6 is an explanatory view illustrating a procedure for boosting a post-boosted voltage VH with respect to a pre-boosted voltage VL when the post-boosted voltage VH is not to be boosted with respect to the pre-boosted voltage VL in accordance with target post-boost voltage setting map.

When determined that the post-boost voltage VH is not to be boosted with respect to the pre-boost voltage VL at Step s120, the CPU calculates maximum torques T1max and T2max that are obtained by driving the motors MG1 and MG2 at the rotational speed Nm1 or Nm2 based on the post-boost voltage VH input at Step S100 in a non-boost state (Step S130). In the embodiment, the maximum torque T1max of the motor MG1 corresponding to the post-boost voltage VH and the rotational speed Nm1 and the maximum torque T2max of the motor MG2 corresponding to the post-boost voltage VH and the rotational speed Nm2 are derived from a map (not shown) previously stored in the memory (not shown) of the motor ECU 40 and defining a relationship between the post-boost voltage VH, the motor rotational speed and the maximum torque of the motor (maximum torque line, see FIG. 6). Then, the CPU determines whether or not an absolute value of the torque command Tm1* input at Step S100 is less than an absolute value of the maximum torque T1max calculated at Step S130 and an absolute value of the torque command Tm2* input at Step S100 is less than an absolute value of the maximum torque T2max calculated at Step S130 (Step S140). When affirmatively determining at Step S140, the CPU derives changeover torques Tref1 and Tref2 that are torques on the boost selection line and correspond to the rotational speed Nm1 or Nm2 input at Step S100 (Step S150). Further, the CPU calculates a difference ΔT1 by subtracting the absolute value of the maximum torque T1max from an absolute value of the changeover torque Tref1 and calculates a difference ΔT2 by subtracting the absolute value of the maximum torque T2max from an absolute value of the changeover torque Tref2 (Step S160). Then, the CPU determines whether or not at least one of the differences ΔT1 and ΔT2 is more than value 0 (Step S170).

The maximum torques obtained from the motor MG1 or MG2 based on the post-boost voltage VH is limited if the pre-boost voltage VL and the post-boost voltage VH drop due to a drop in the inter-terminal voltage VB of the battery 50 with increase of the discharge current when the post-boost voltage VH is not boosted with respect to the pre-boost voltage VL by the hoot converter 55 (when VH=VL). When the drop of the post-boost voltage VH occurs, torques corresponding to the torque command Tm1* or Tm2* (target operation point) may be output from the motor MG1 or MG2 while the post-boost voltage VH is not boosted with respect to the pre-boost voltage VL if the boost region includes the whole of the maximum torque line defining the maximum torque T1max or T2max that obtained by driving the motor MG1 or MG2 based on the post-boost voltage VH according to the rotational speed Nm1 or Nm2. However, if the non-boost region includes at least a part of the maximum torque line, it may not be possible to meet a demand for outputting a torque more than the maximum torque T1max or T2max corresponding to the present post-boost voltage VH and the rotational speed Nm1 or Nm2 when the post-boost voltage VH is not boosted. Accordingly, the CPU determines whether or not the differences ΔT1 and ΔT2 is more than value 0 at Step S170 so as to determines whether or not the target operation points of the motors MG1 and MG2 are included in a region (see a hatched area in FIG. 6) having a impossibility of outputting the torque more than the maximum torque T1max or T2max corresponding to the present post-boost voltage VH and the rotational speed Nm1 or Nm2 when the post-boost voltage is not boosted.

When determined that the at least one of the differences ΔT1 and ΔT2 is more than value 0 at Step S170, the CPU estimates a next target operation points of the motors MG1 and MG2 based on the present target operation points and the target operation points in the last execution of the routine of the motors MG1 and MG2 (Step S180). In the embodiment, the CPU assumes that the operation points of the motors MG1 and MG2 respectively linearly changes from the present target operation points to the next target operation points so as to obtain the next target operation point of the motors MG1 and MG2 using a gradient between the last target operation point and the present target operation point. For example, the next target operation point (next Nm2 and next Tm2*) of the motor MG2 is calculated in accordance with next equations (1) and (2). In the equations (1) and (2), "dt" represents the execution interval of the routine. After estimating the target operation points of the motors MG1 and MG2, the CPU determines whether or not at least one of absolute values of estimated next torque commands (next Tm1* and next Tm2*) of the motors MG1 and MG2 is more than the absolute value of the maximum torque corresponding to the post-boost voltage VH input at Step S100 and the estimated next rotational speed (next Nm1 or next Nm2) of the motor MG1 or MG2 (Step S190). When determined that at least one of absolute values of estimated next torque commands of the motors MG1 and MG2 is more than the absolute value of the maximum torque, at least one of the motors MG1 and MG2 may not output the torque corresponding to the torque command unless the post-boost voltage VH is boosted after a next execution of the routine. Accordingly, the CPU resets the target post-boost voltage VHtag to a predetermined value V1 that is larger than the rated voltage of the battery 50 for example (Step S200) and executes processes of Steps S210 and S220. Then, the CPU returns to Step S100 to repeat the processes of and after Step S100. Thus, in the hybrid vehicle 20 of the embodiment, the boost converter 55 is controlled so as to boost the post-boost voltage VH with respect to the pre-boost voltage VL when the post-boost voltage VH is not to be boosted with respect to the pre-boost voltage VL in accordance with the target post-boost voltage setting map or the boost restriction, at least one of the absolute values of the maximum torques T1max and T2max obtained by driving the motors MG1 and MG2 at the present rotational speed Nm1 or Nm2 based on the post-boost voltage VH is less than the absolute value of the changeover torque Tref1 or Tref2 on the boost selection line that corresponds to the present rotational speed Nm1 or Nm2, and the absolute value of the estimated torque in the next target operation point of the motor MG1 or MG2 is more than the absolute value of the maximum torque that is obtained by driving the motors MG1 or MG2 at the rotational speed Nm1 or Nm2 in the next operation point of the motor MG1 or MG2 based on the post-boost voltage VH input at Step S100.

$$\text{next } Nm2 = \text{present } Nm2 + (\text{present } Nm2 - \text{last } Nm2)/(\text{present } Tm2^* - \text{last } Tm2^*) \times dt \quad (1)$$

$$\text{next } Tm2^* = \text{present } Tm2^* + (\text{present } Tm2^* - \text{last } Tm2^*)/(\text{present } Nm2 - \text{last } Nm2) \times dt \quad (2)$$

When determined that at least one of the absolute values of the torque commands Tm1* and Tm2* is equal to or more than the absolute value of the maximum torque T1max or the absolute value of the maximum torque T2max calculated at Step S130 (Step S140) after determined that the post-boost voltage VH is not to be boosted with respect to the pre-boost voltage VL at Step S120, at least one of the motors MG1 and MG2 may not output the torque corresponding to the torque command unless the post-boost voltage VH is boosted after the next execution of the routine. In this case, the CPU resets the target post-boost voltage VHtag to the predetermined value V1 that is larger than the rated voltage of the battery 50 for example (Step S200) and executes processes of Steps S210 and S220. Then, the CPU returns to Step S100 to repeat the processes of and after Step S100. That is, in the hybrid vehicle 20 of the embodiment, the boost converter 55 is controlled so as to boost the post-boost voltage VH with respect to the pre-boost voltage VL when the torque commands Tm1* or Tm2* reaches the maximum torque T1max or T2max that is obtained by driving the motors MG1 or MG2 at the rotational speed Nm1 or Nm2 based on the post-boost voltage VH input at Step S100 while the post-boost voltage VH is not to be boosted with respect to the pre-boost voltage VL in accordance with the target post-boost voltage setting map or the boost restriction.

On the other hand, when determined that both of the differences ΔT1 and ΔT2 are equal to or less than value 0 at Step S170 or when determined that at least one of absolute values of estimated next torque commands of the motors MG1 and MG2 are equal to or more the above absolute values of the maximum torques at Step S190 after the determining that the post-boost voltage VH is boosted with respect to the pre-boost voltage VL at Step S120, the CPU sets the post-boost voltage command VH* used for controlling the switching of the boost converter 55 to the post-boost voltage VH input at Step S100 in view of the control of the boost converter 55 (Step S230), and returns to Step S100 to repeat the processes of and after Step S100 without controlling the switching of the boost converter 55 for a boost operation.

Next, a setting procedure of the control mode of the inverters 41 and 42 in the hybrid vehicle 20 of the embodiment will be described with reference to FIGS. 7 and 8.

Figure 7:
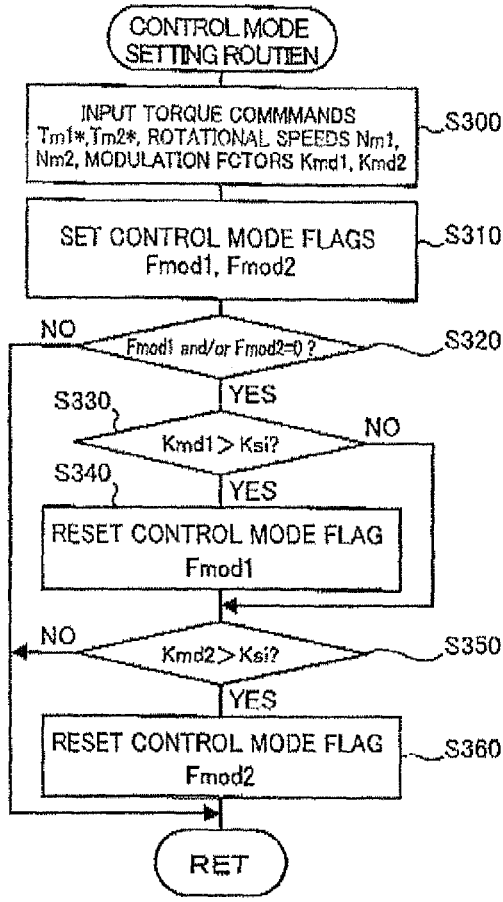
FIG. 7 is a flowchart illustrating an example of a control mode setting routine executed by the motor ECU 40 of the embodiment.

FIG. 7 is a flowchart illustrating an example of a control mode setting routine executed by the motor ECU 40 of the embodiment at preset time intervals. At a start of the control mode setting routine of FIG. 7, the CPU (not shown) of the motor ECU 40 executes an input process of data required for control such as the torque commands Tm1* and Tm2* to the motors MG1 and MG2 and present rotational speeds Nm1 and Nm2 of the motors MG1 and MG2 from the hybrid ECU 70, modulation factors Kmd1 and Kmd2 of the inverters 41 and 42 and the like (Step S300). The modulation factors Kmd1 car Kmd2 is obtained by dividing an induced voltage (line voltage amplitude) Vamp calculated in accordance with following Equations (3) and (4) based on a d-axis voltage command value Vd* and a q-axis voltage command value Vq* generated by controlling the switching of the inverters 41 or 42 by the post-boost voltage VH in accordance with a following Equation (5).

$$Vamp = |Vd^*| \cdot \cos\phi + |Vq^*| \cdot \sin\phi \quad (3)$$

$$\tan\phi = Vq^*/Vd^* \quad (4)$$

$$Kmd1 \text{ or } Kmd2 = Vamp/VH \quad (5)$$

After the data input process of step S300, the CPU selects the control modes used for controlling the inverter 41 corresponding to the motor MG1 and the inverter 42 corresponding to the motor MG2 based on the torque commands Tm1* and Tm2* to the motors MG1 and MG2, the rotational speeds Nm1 and Nm2 of the motors MG1 and MG2, and control mode setting maps prepared for each of the motors MG1 and MG2 and stored in the memory (not shown) of the motor ECU 40, and sets control mode flags Fmod1 and Fmod2 that respectively indicate the selected control mode that is one of the sine-wave PWM control mode, the overmodulation PWM control mode, and the rectangular-wave control mode (Step S310). At Step S310, the control mode flag Fmod1 is set to value 0 when the sine-wave PWM control mode is selected as the control mode from the control mode setting map for the motor MG1 according to the target operation point (present rotational speed Nm1 and the torque command Tm1*) of the motor MG1, to value 1 when the overmodulation PWM control mode is selected as the control mode, and to value 2 when the rectangular-wave control mode is selected as the control mode. Similarly, the control mode flag Fmod2 is set to value 0 when the sine-wave PWM control mode is selected as the control mode from the control mode setting map for the motor MG2 according to the target operation point (present rotational speed Nm2 and the torque command Tm2*) of the motor MG2, to value 1 when the overmodulation PWM control mode is selected as the control mode, and to value 2 when the rectangular-wave control mode is selected as the control mode.

Figure 8:
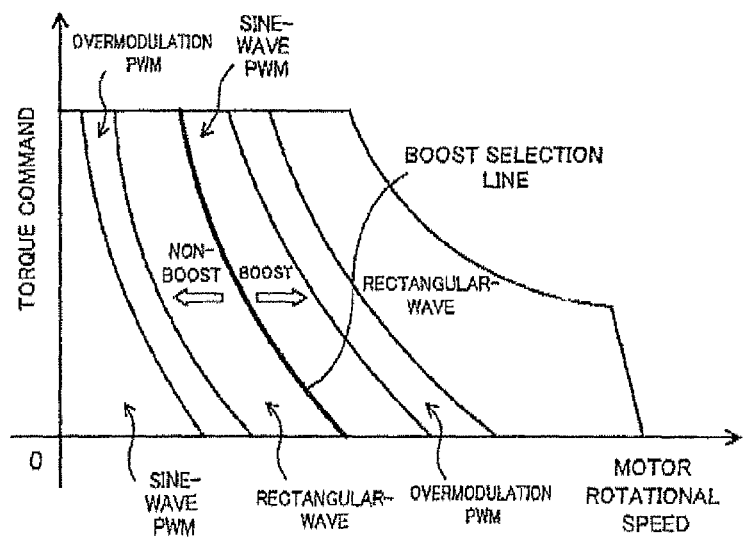
FIG. 8 is an explanatory view exemplifying a control mode setting map.

FIG. 8 shows an example of the control mode setting map. This drawing exemplifies a first quadrant of the control mode setting map, that is, an area having positive values for both the motor torque command and the motor rotational speed. As seen from FIG. 8, each control mode setting map is associated with the above target post-boost voltage setting map and is prepared to divide operation region of the motor MG1 or the motor MG2 into a region where the sine-wave PWM control mode is used, a region where the overmodulation PWM control mode is used, and a region where the rectangular-wave control mode is used. In the embodiment, the non-boost region and the boost region defined by the boost selection line are respectively divided into a region where the sine-wave PWM control mode is used, a region where the overmodulation PWM control mode is used, and a region where the rectangular-wave control mode is used in order of increasing the motor rotational speed basically. That is, in the hybrid vehicle 20 of the embodiment, the sine-wave PWM control mode, the overmodulation PWM control mode, and the rectangular-wave control mode are selectively used when the post-boost voltage VH is not boosted with respect to the pre-boost voltage VL and when the post-boost voltage VH is boosted with respect to the pre-boost voltage VL by the boost converter 55, and the inverters 41 and 42 are respectively controlled so as to make the motor MG1 or MG2 output the torque equivalent to the torque command Tm1* or Tm2*. The rectangular-wave control mode is typically used only when the boost converter 55 boosts the post-boost voltage VH with respect to the pre-boost voltage VL. However, by extending the scope of application of the rectangular-wave control mode to the non-boost time of the post-boost voltage VH, the output of the motors MG1 and MG2 can be secured even if reducing the state in which the post-boost voltage VH is boosted by the boost converter 55, thereby improving the efficiency upon driving and controlling the motors MG1 and MG2.

Then, the CPU determines whether or not at least one of the control mode flags Fmod1 and Fmod2 set at Step S310 is value 0, that is, whether or not the sine-wave PWM control mode is selected as the control mode of at least one of inverters 41 and 42 at Step S310 (Step S320). When at least one of the control mode flags Fmod1 and Fmod2 is value 0, the CPU determines whether or not the modulation factor Kmd1 of the inverter 41 input at Step S300 is more than a predetermined threshold value Ksi (Step S330). The threshold value Ksi is a maximum value of the modulation factor in the sine-wave PWM control mode or a value smaller than the maximum value in some degree. When determined that the modulation factor Kmd1 of the inverter 41 is more than the threshold value Ksi at Step S330, the inverter 41 is essentially controlled under the sine-wave PWM control mode, but the post-boost voltage VH is not adequately boosted with respect to the induced voltage of the motor MG1. Accordingly, in this case, the CPU sets the control mode flag Fmod1 to value 2 so that the inverter 41 is to be controlled under the rectangular-wave control method (Step S340). The process of the Step S340 is skipped when negatively determined at step S330. After the process of the Steps S330 or S340, the CPU determines whether or not the modulation factor Kmd2 of the inverter 42 input at Step S300 is more than the above threshold value Ksi (Step S350). When determined that the modulation factor Kmd2 of the inverter 42 is more than the above threshold value Ksi at Step S350, the inverter 42 is essentially controlled under the sine-wave PWM control mode, but the post-boost voltage VH is not adequately boosted with respect to the induced voltage of the motor MG2. Accordingly, in this case, the CPU sets the control mode flag Fmod2 to value 2 so that the inverter 42 is to be controlled under the rectangular-wave control method (Step S360) and terminates the routine. The process of the Step S360 is skipped and the routine is terminated when negatively determined at Step S350. Thus, in the hybrid vehicle 20 of the embodiment, the control modes of the inverters 41 and 42 are respectively set to one of the sine-wave PWM voltage, the overmodulation PWM control mode and the rectangular-wave control, mode based on the operation points of the motors MG1 and MG2 and the control mode setting map basically (Step S310). Further, the control modes of the inverters 41 and 42 are changed in accordance with the modulation factors Kmd1 and Kmd2 of the inverters 41 and 42 depending on the boost state of the post-boost voltage VH by the boost converter 55 (Steps S320-S360). Thus, the sine-wave PWM voltage, the overmodulation PWM control mode and the rectangular-wave control mode can be optimally and selectively used As has been described above, in the hybrid vehicle 20 of the embodiment, the boost converter 55 is controlled to make the post-boost voltage VH become the target post-boost voltage VHtag that is the target value corresponding to the target operation point of the motor MG1 or MG2 in accordance with the target post-boost voltage setting map or the boost restriction dividing the operation region of the motor MG1 or MG2 into the non-boost region and the boost region when the target operation point of the motor MG1 or MG2 is included in the boost region. The target post-boost voltage setting map of the embodiment is prepared so that the non-boost region includes the region in which the loss produced by driving the motor MG1 or MG2 when not boosting the post-boost voltage VH becomes smaller than the loss produced when boosting the post-boost voltage VH, and the boost region includes the region in which the loss produced when boosting the post-boost voltage VH becomes smaller than the loss produced when not boosting the post-boost voltage VH. Thus, in the hybrid vehicle 20, the boost converter 55 basically boosts the post-boost voltage VH with respect to the pre-boost voltage VL when the loss produced by driving the motor MG1 or MG2 when boosting the post-boost voltage VH becomes smaller than the loss produced when not boosting the post-boost voltage VH, so that the non-boost region is substantially enlarged within the operation region of the motors MG1 and MG2. Accordingly, the hybrid vehicle 20 optimally defines the non-boost region in which the post-boost voltage VH is not boosted with respect to the pre-boost voltage VL and the boost region in which the post-boost voltage VH is boosted with respect to the pre-boost voltage VL so that the boost converter 55 appropriately boosts the post-boost voltage VH with respect to the pre-boost voltage VL, thereby improving the efficiency upon driving and controlling the motors MG1 and MG2. Further, it is possible to appropriately define the non-boost region and the boost region by considering the sum of losses in the motors MG1 and MG2, losses in inverters 41 and 42, and the loss in the boost converter 55 in the state where the post-boost voltage VH is boosted or not boosted with respect to the pre-boost voltage VL by the boost converter 55 as the loss produced by driving the motors MG1 and MG2 when preparing the target post-boost voltage setting maps.

Figure 9:
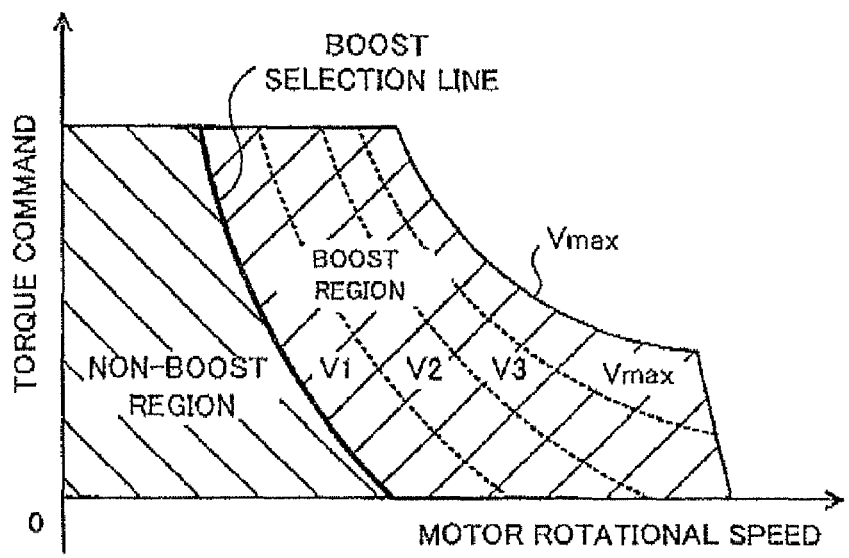
FIG. 9 is an explanatory view illustrating another target post-boost voltage setting map.
Figure 10:
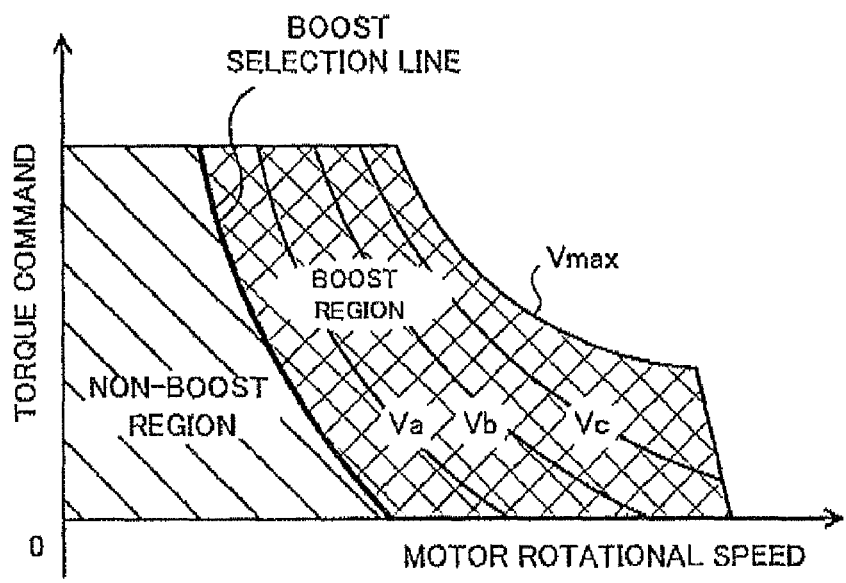
FIG. 10 is an explanatory view illustrating still another target post-boost voltage setting map.

In the above embodiment, the target post-boost voltage setting map defines the target post-boost voltage VHtag based on the induced voltage at the operation point of the motor MG1 or MG2 in the boost region for each of the operation points. Thus, the loss produced by driving the motor MG1 or MG2 can be reduced while the motor MG1 or MG2 operates in the boost region, and the boost converter 55 can be controlled in accordance with a change of the operation point of the motor MG1 or MG2 so as to continuously change the post-boost voltage VH. Accordingly, it is possible to improve the efficiency when the motor MG1 or MG2 is driven while boosting the post-boost voltage VH. As shown in FIG. 9, the target post-boost voltage setting map may divide the boost region into a plurality of equal voltage regions and define the target post-boost voltage VHtag for each of the equal voltage regions, for example V1, V2, V3, Vmax. According to the target post-boost voltage setting map of FIG. 9, the boost region is divided into the plurality of equal voltage regions while considering the loss produced when the motor MG1 or MG2 is driven. Thus, it is possible to improve the efficiency when the motors MG1 and MG2 are driven while boosting the post-boost voltage VH. The target post-boost voltage setting map or the boost restriction may be an example shown in FIG. 10. In the target post-boost voltage setting map of FIG. 10, equal voltage lines Va-Vc are defined between the rated voltage of the battery 50 and a maximum voltage Vmax of the post-boost voltage VH based on the induced voltage in each operation point of the boost region and the like, and the target post-boost voltage VHtag is defined for each operation point included in the boost region by a linear interpolation between the rated voltage of the battery 50 and the equal voltage line Va-Vc and the maximum voltage Vmax of the post-boost voltage VH. Further, in the hybrid vehicle 20 including the two motors MG1 and MG2, the target post-boost voltage setting map or the boost restriction is prepared for each of the motors MG1 and MG2, and the target post-boost voltage VHtag for controlling is set to the larger one of the target post-boost voltage based on the target operation point of the motor MG1 and the target post-boost voltage setting map for the motor MG1, and the target post-boost voltage based on the target operation point of the motor MG2 and the target post-boost voltage setting map for the motor MG2. Thus, the target post-boost voltage VHtag can be optimally determined when the two motors MG1 and MG2 are driven and controlled.

In the hybrid vehicle 20 of the embodiment, the boost converter 55 is controlled so as to boost the post-boost voltage VH with respect to the pre-boost voltage VL (Steps S200-S220) when the post-boost voltage VH is not to be boosted with respect to the pre-boost voltage VL in accordance with the target post-boost voltage setting map or the boost restriction, at least one of the absolute values of the maximum torques T1max and T2max obtained by driving the motors MG1 and MG2 at the present rotational speed Nm1 or Nm2 based on the post-boost voltage VH is less than the absolute value of the changeover torque Tref1 or Tref2 on the boost selection line that corresponds to the present rotational speed Nm1 or Nm2 (Steps S160 and S170), and the absolute value of the estimated torque in the next target operation point of the motor MG1 car MG2 is more than the absolute value of the maximum torque that is obtained by driving the motors MG1 or MG2 at the rotational speed Nm1 or Nm2 in the next operation point of the motor MG1 or MG2 based on the post-boost voltage V1 (Steps S180 and S190). By determining whether or not the post-boost voltage VH is boosted based on the next target operation points estimated from the target operation points of the motors MG1 and MG2 in accordance with a comparison result between the maximum torques T1max, T2max and the changeover torques Tref1, Tref2, the state in which the post-boost voltage VH is boosted for all that the operation point of the motor MG1 or MG2 is included in the non-boost region can be further reduced.

In the hybrid vehicle 20 of the embodiment, the boost converter 55 is controlled so as to boost the post-boost voltage VH with respect to the pre-boost voltage VL (Steps S200-S220) when the post-boost voltage VH is not to be boosted with respect to the pre-boost voltage VL in accordance with the target post-boost voltage setting map, and when determined that at least one of the absolute values of the torque commands Tm1* and Tm2* is equal to or more than the absolute value of the maximum torque T1max or the absolute value of the maximum torque T2max, that is, when determined that at least one of the absolute values of the torque commands Tm1* and Tm2* reaches the absolute value of the maximum torque T1max or the absolute value of the maximum torque T2max (Step S140). Thus, the motors MG1 and MG2 can be reliably operated at the target operation points even if the post-boost voltage VH (and the pre-boost voltage VL) decreases when the operation point of the motor MG1 or MG2 is included in the non-boost region. In this case, the maximum torques T1max and T2max are not limited to the maximum torques obtained by driving the motors MG1 and MG2 at the rotational speed Nm1 or Nm2 based on the post-boost voltage VH. The maximum torques T1max and T2max may be maximum torques obtained by driving the motors MG1 and MG2 at the rotational speed Nm1 or Nm2 based on the inter-terminal voltage VB of the battery 50. By obtaining the maximum torques T1max and T2max based on the inter-terminal voltage VB of the battery 50, the motors MG1 and MG2 can be reliably operated at the target operation points even if the inter-terminal voltage VB of the battery 50 and the post-boost voltage VH (and the pre-boost voltage VL) decreases when the operation point of the motor MG1 or MG2 is included in the non-boost region.

Figure 11:
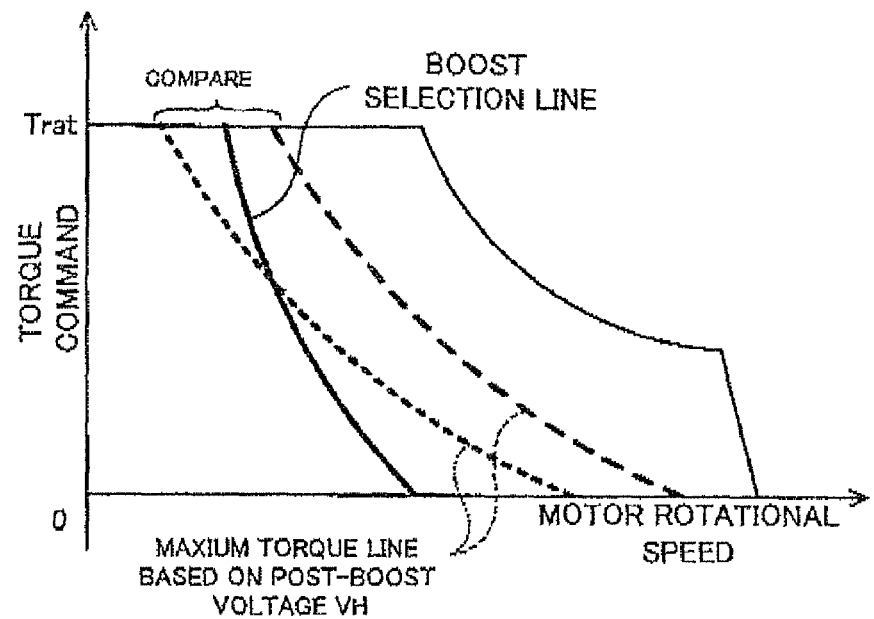
FIG. 11 is an explanatory view illustrating another procedure for boosting the post-boosted voltage VH with respect to the pre-boosted voltage VL when the post-boosted voltage VH is not to be boosted with respect to the pre-boosted voltage VL in accordance with target post-boost voltage setting map.

In order to determines whether or not the torque commands Tm1* and Tm2* can be secured even if the inter-terminal voltage VB (maximum torques of the motors MG1 and MG2) drops when the post-boost voltage VH is not boosted, it is possible to determine whether or not the maximum torque line defining the maximum torque that obtained by driving the motor MG1 or MG2 based on the post-boost voltage VH according to the rotational speed Nm1 or Nm2 and the boost selection line cross each other as shown in FIG. 11 while the post-boost voltage VH is not boosted with respect to the pre-boost voltage VL in accordance with the target post-boost voltage setting map instead of comparing the maximum torques T1max, T2max and the changeover torques Tref1, Tref2 as in the above embodiment. As seen from FIG. 11, the maximum torque line and the boost selection line cross each other when the rotational speed (absolute value) corresponding to a rated maximum torque Trat of the motor MG1 or MG2 on the maximum torque line based on the post-boost voltage VH is smaller than the rotational speed (absolute value) corresponding to the rated maximum torque Trat on the boost selection line. In such a case, the boost converter 55 may be controlled so as to make the post-boost voltage VH become a predetermined target post-boost voltage larger than the rated voltage of the battery 50. Thus, the post-boost voltage VH is boosted so as to increase the torque obtainable from the motor MG1 or MG2 and satisfy the demand for the output of the torque when the output of the torque larger than the maximum torque is demanded while not boosting the post-boost voltage VH.

Figure 12:
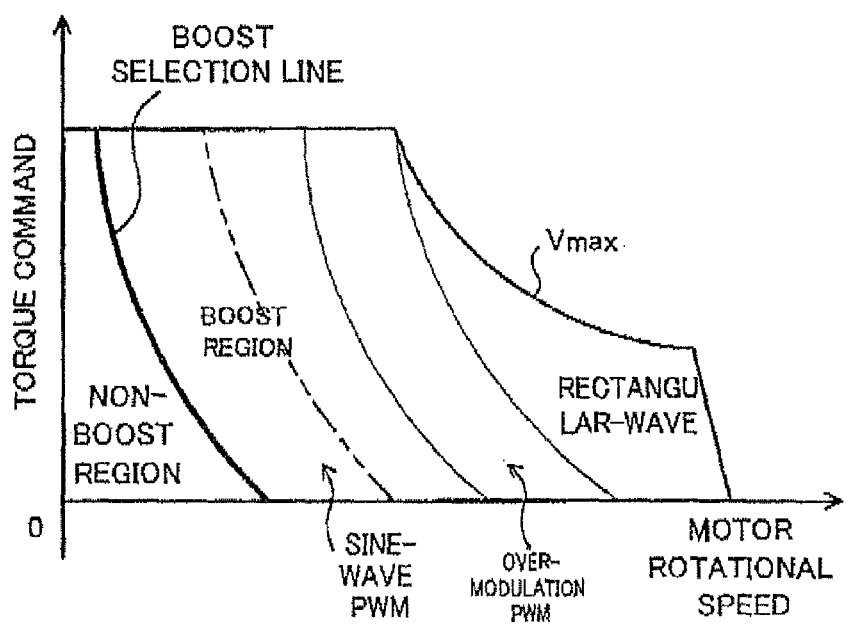
FIG. 12 is an explanatory view illustrating still another target post-boost voltage setting map.

Further, in the case of providing a second target post-boost voltage setting map exemplified in FIG. 12 that tends to frequently use the boost of the post-boost voltage on VH in comparison with the target post-boost voltage setting map of FIG. 4 in addition to the target post-boost voltage setting map of FIG. 4, the second target post-boost voltage setting map may be used when negatively determined at Step S140 of FIG. 3, when affirmatively determining at Step S190 of FIG. 3 (or when affirmatively determining at Step S170 of FIG. 3), and when the maximum torque line and the boost selection line cross each other as exemplified in FIG. 11. When the target operation Point of the motor MG1 or MG2 included in the boost region of the second target post-boost voltage setting map, the boost converter 55 may be controlled so as to make the post-boost voltage VH become a predetermined target post-boost voltage larger than the rated voltage of the battery 50. Thus, the post-boost voltage VH is boosted so as to increase the torque obtainable from the motor MG1 or MG2 and satisfy the demand for the output of the torque when the output of the torque larger than the maximum torque based on the post-boost voltage VH is demanded while not boosting the post-boost voltage VH. When using the second target post-boost voltage setting map exemplified in FIG. 12, as shown in FIG. 12, it is preferable to enlarge the region of the boost region in which the sine-wave PWM control mode is used to some extent so that the inverters 41 and 42 are controlled by the sine-wave PWM control mode in a region centering on the boost selection line in the target post-boost voltage setting map of FIG. 4 (see two-dot line in FIG. 12) when boosting the post-boost voltage.

In the hybrid vehicle 20 of the embodiment, as shown in FIG. 7, the inverters 41 and 42 are controlled so as to make the motors MG1 and MG2 operate at the target operation point selectively using the sine-wave PWM control mode, the overmodulation PWM control mode, and the rectangular-wave control mode when the post-boost voltage VH is not boosted with respect to the pre-boost voltage VL by the boost converter 55 and when the post-boost voltage VH is boosted with respect to the pre-boost voltage VL by the boost converter 55. The rectangular-wave control mode is typically used only when the boost converter 55 boosts the post-boost voltage VH with respect to the pre-boost voltage VL. However, by extending the scope of application of the rectangular-wave control mode to the non-boost time of the post-boost voltage VH, the output of the motor can be secured even if reducing the state in which the post-boost voltage VH is boosted, thereby improving the efficiency upon driving and controlling the motors MG1 and MG2. Further, in the hybrid vehicle 20 of the embodiment, the control modes of the inverters 41 and 42 are respectively set to one of the sine-wave PWM voltage, the overmodulation PWM control mode and the rectangular-wave control mode in accordance with the target operation points of the motors MG1 and MG2 and the control mode setting map (Step S310), and the control modes of the inverters 41 and 42 are reset in accordance with the modulation factors Kmd1 and Kmd2 of the inverters 41 and 42 depending on the boost state of the post-boost voltage VH by the boost converter 55 (Steps S320-S360). Thus, the sine-wave PWM voltage, the overmodulation PWM control mode and the rectangular-wave control mode can be optimally and selectively used. The setting procedure of the control mode of the inverters 41 and 42 is not limited to the example shown in FIG. 7. The setting procedure of the control modes of the inverters 41 and 42 may be any configuration of setting the control modes of the inverters 41 and 42 in accordance with at least one of the target operation points of the motors MG1 and MG2 and the modulation factors Kmd1 and Kmd2 of the inverters 41 and 42. For example, after temporarily setting the control modes of the inverters 41 and 42 in accordance with the target operation points of the motors MG1 and MG2 and the control mode setting map, the control mode of the inverter 41 or 42 may be set to the temporarily set control mode when the temporary control mode derived from the control mode setting map and the modulation factor Kmd1 or Kmd2 that changes depending on the operation state of the boost converter 55 correspond to each other, and the control mode of the inverter 41 or 42 may be set to the control mode corresponding to the modulation factor Kmd1 or Kmd2 when the temporary control mode derived from the control mode setting map and the modulation factor Kmd1 or Kmd2 do not correspond to each other.

Figure 13:
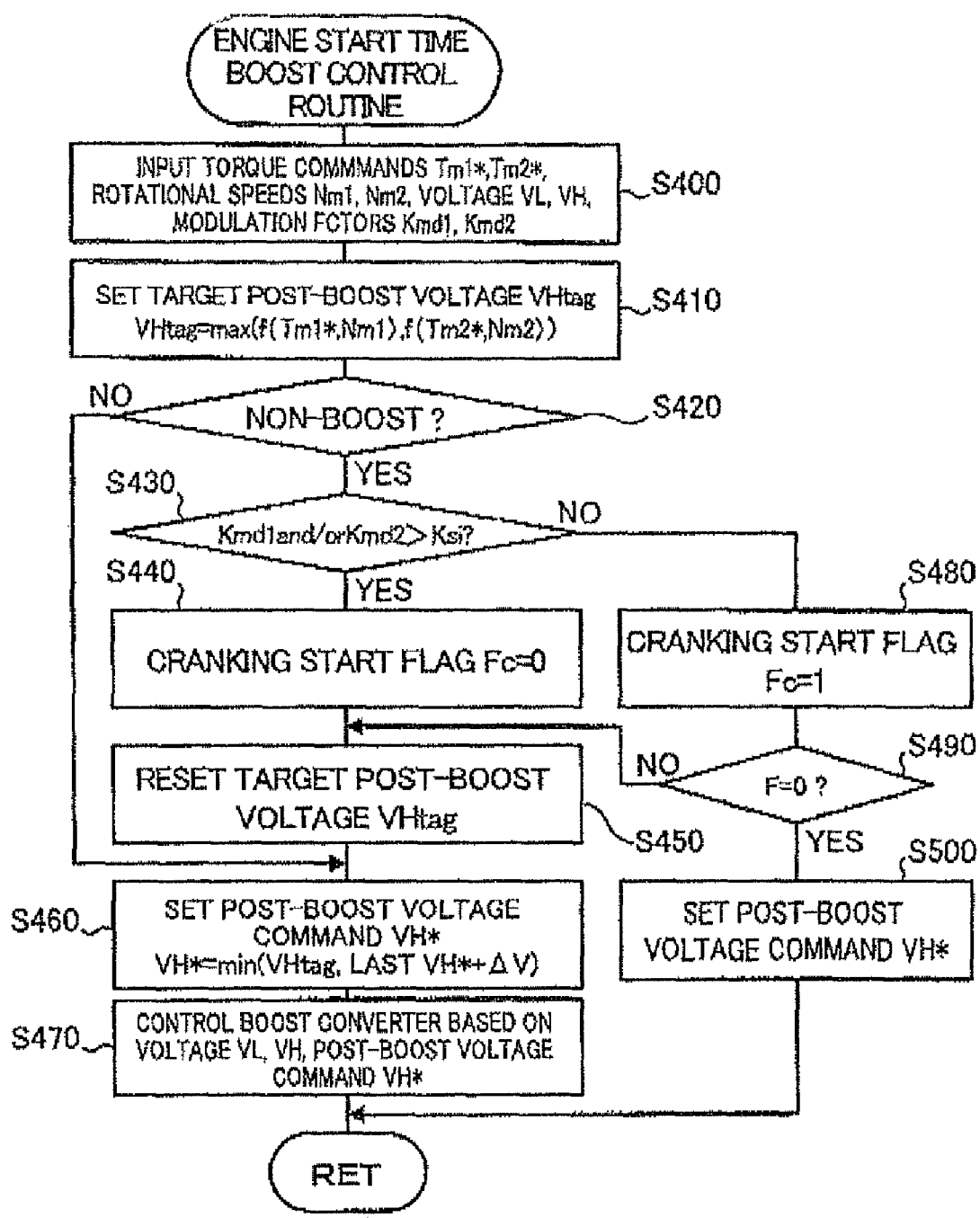
FIG. 13 is a flowchart illustrating an example of an engine start time boost control routine executed by the motor ECU 40 of the embodiment.

Subsequently, an modification of the present invention will be described. FIG. 13 is a flowchart illustrating an example of an engine start time boost control routine executed by the motor ECU 40 of the embodiment after a start of the engine 22 is demanded while the hybrid vehicle 20 is stopped or the hybrid vehicle 20 is driven in the motor drive mode until the start of the engine 22 is completed.

At a start of the engine start time boost control routine of FIG. 13 in response to the start demand of the engine 22, the CPU (not shown) of the motor ECU 40 executes an input process of data required for control such as the torque commands Tm1* and Tm2* to the motors MG1 and MG2 and present rotational speeds Nm1 and Nm2 of the motors MG1 and MG2 from the hybrid ECU 70, the pre-boost voltage VL, the post-boost voltage VH, the modulation factors Kmd1 and Kmd2 of the inverters 41 and 42 and the like (Step S400). The modulation factors Kmd1 and Kmd2 are calculated in accordance with the above equations (3)-(5). After the data input at Step S400, the CPU sets the target post-boost voltage VHtag according to a drive state of the hybrid vehicle 20 (Step S410). At Step S410, the target post-boost voltage VHtag is set to a larger one of a value that corresponds to the target operation point of the motor MG1 and is derived from the target post-boost voltage setting map for the motor MG1 (refer to FIG. 4) and a value that corresponds to the target operation point of the motor MG2 and is derived from the target post-boost voltage setting map for the motor MG2 (refer to FIG. 4). Then, the CPU compares the set target post-boost voltage VHtag and the pre-boost voltage VL input at Step S400 for example so as to determine whether or not the post-boost voltage VH is boosted with respect to the pre-boost voltage VL (Step S420). When the post-boost voltage VH is to be boosted, the CPU sets a post-boost voltage command VH* to a smaller one of the target post-boost voltage VHtag set at Step S410 and a value that is a sum of the post-boost voltage command VH* in the last execution of the routine and the predetermined boost rate ΔV (Step S460). Then, the CPU controls the switching of the transistors T31 and T32 of the boost converter 55 in accordance with the set post-boost voltage command VH*, the pre-boost voltage VL and the post-boost voltage VH input at Step S400 so as to make the post-boost voltage VH become the post-boost voltage command VH* (Step S470), and returns to Step S400 to repeat the processes of and after Step S400.

When determined that the post-boost voltage VH is not to be boosted with respect to the pre-boost voltage VL at Step S420, the CPU determines whether or not at least one of the modulation factors Kmd1 and Kmd2 of the inverters 41 and 42 input at Step S400 is more than the predetermined threshold value Ksi that is the maximum value of the modulation factor in the sine-wave PWM control mode or the value smaller than the maximum value in some degree. (Step S430). When at least one of the modulation factors Kmd1 and Kmd2 of the inverters 41 and 42 input at Step S400 is more than the threshold value Ksi, the CPU sets a cranking start flag Fc that is set to value 1 when a cranking of the engine 22 by the motor MG1 is permitted to value 0 and sets a predetermined flag F that is set to value 0 under a normal state to value 1 (Step S440). Then, the CPU resets the target post-boost voltage VHtag to the predetermined value V1 that is larger than the rated voltage of the battery 50 for example (Step S450). After this, the CPU executes processes of Steps S460 and S470 and returns to Step S400 to repeat the processes of and after Step S400.

When determined that the modulation factors Kmd1 and Kmd2 of the inverters 41 and 42 are equal to or less than the threshold value Ksi at Step S430 after determined that the post-boost voltage VH is not to be boosted with respect to the pre-boost voltage VL at Step S420, the CPU sets the above cranking start flag Fc to value 1 so as to permit the cranking of the engine 22 by the motor MG1 (Step S480). Then, the CPU determines whether or not the above flag F is value 0, that is whether or not both the modulation factors Kmd1 and Kmd2 of the inverters 41 and 42 are equal to or less than the threshold value Ksi and the inverters 41 and 42 are (were) controlled by the sine-wave PWM control mode just after the start of the engine 22 is demanded (Step S490). When the flag F is value 1 and at least one of the inverters 41 and 42 is controlled by the overmodulation PWM control mode or the rectangular-wave control mode just after the start of the engine 22 is demanded, the CPU executes the above processes of Steps S450-S470 and returns to Step S400 to repeat the processes of and after Step S400. On the other hand, when determined that the flag F is value 0 at Step S490, that is, when the post-boost voltage VH is not boosted with respect to the pre-boost voltage VL and both the inverters 41 and 42 are controlled by the sine-wave PWM control mode just after the start of the engine 22 is demanded, the CPU sets the post-boost voltage command VH* used for controlling the switching of the boost converter 55 to the post-boost voltage VH input at Step S400 in view of the control of the boost converter 55 (Step S500), and returns to Step S400 to repeat the processes of and after Step S400 without controlling the switching of the boost converter 55 for a boost operation.

As described above, when the routine of FIG. 13 is executed in response to the start demand of the engine 22, the cranking of the engine 22 is prohibited irrespective of the start demand of the engine 22 (Step S440) and the boost converter 55 is controlled so as to boost the post-boost voltage VH with respect to the pre-boost voltage VL (Step S450-S470) when the post-boost voltage VH is not to be boosted with respect to the pre-boost voltage VL in accordance with the target post-boost voltage setting map or the boost restriction, at least one of the modulation factors Kmd1 and Kmd2 is more than the threshold value Ksi, and at least one of the inverters 41 and 42 (motors MG1 and MG2) is controlled by the overmodulation PWM control mode or the rectangular-wave control mode. When the cranking is prohibited in response to the start demand of the engine 22 and the post-boost voltage VH is boosted, the cranking of the engine 22 is permitted (Step S440) after determined that both the modulation factors Kmd1 and Kmd2 become equal to or less than the threshold value Ksi and the inverters 41 and 42 are controlled by the sine-wave PWM control mode (Step S430) and the post-boost voltage VH is continually boosted (Step S450-S470). That is, when the start of the engine 22 is demanded while the post-boost voltage VH is not to be boosted with respect to the pre-boost voltage VL in accordance with the target post-boost voltage setting map or the boost restriction, the boost of the post-boost voltage VH is started and the cranking of the engine 22 is prohibit if at least one of the inverters 41 and 42 is controlled by the overmodulation PWM control mode or the rectangular-wave control mode. Then, the cranking of the engine 22 is started when both the inverters 41 and 42 come to be controlled by the sine-wave PWM control mode with increase of the post-boost voltage VH. Until the start of the engine 22 is completed, the post-boost voltage VH is continually boosted (Step S450-S470) and both the inverters 41 and 42 are controlled by the sine-wave PWM control mode. Accordingly, when the routine of FIG. 13 is used, the start of the cranking of the engine 22 may be slightly delayed when the engine 22 is started in response to an accelerator operation or a driving force demand of the driver. In this case, however, both the inverters 41 and 42 are controlled by the Sine-wave PWM control mode superior in the control accuracy when the cranking of the engine 22 is executed, so that the vibration control with torque controls of the motors MG1 and MG2 is optimally performed, thereby reliably reducing the vibration generated when the engine 22 is started.

Figure 14:
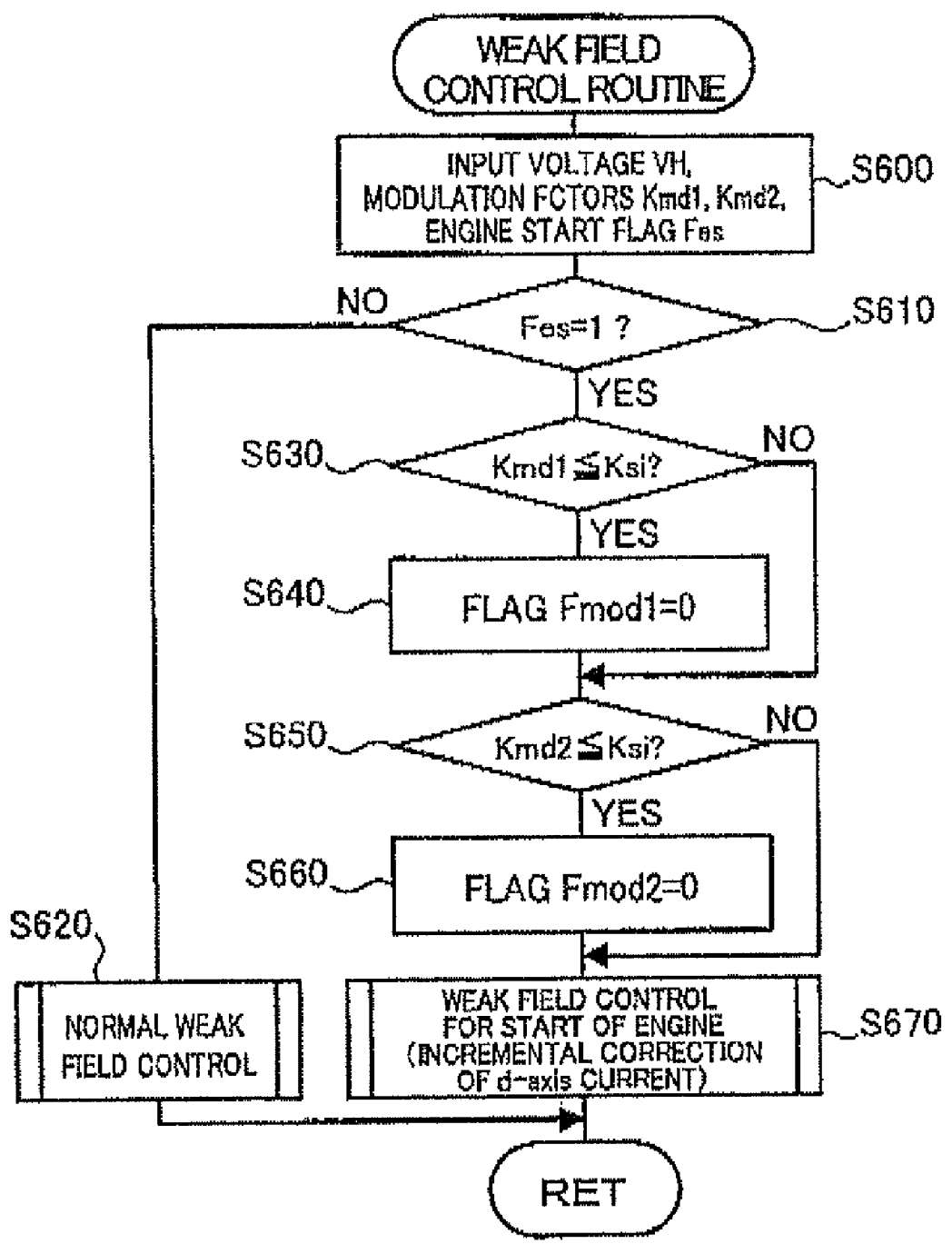
FIG. 14 is a flowchart illustrating an example of a weak field control routine executed by the motor ECU 40 of the embodiment.

FIG. 14 is a flowchart illustrating an example of a weak field control routine executed by the motor ECU 40 at preset time intervals in the above hybrid vehicle 20.

At a start of the weak field control routine of FIG. 14, the CPU (not shown) of the motor ECU 40 executes an input process of data required for control such as the post-boost voltage VH, the modulation factors Kmd1 and Kmd2 of the inverters 41 and 42, and engine start flag Fes and the like (Step S600). The modulation factors Kmd1 and Kmd2 are calculated in accordance with the above equations (3)-(5). The engine start flag Fes is set to value 1 by the hybrid ECU 70 when the stopped engine 22 is to be started for example, and is set to value 0 when the start of the engine 22 is completed. Then, the CPU determines whether or not the input engine start flag Fes is value 1 (Step S610). When the engine start flag Fes is value 0, the CPU executes a normal weak field control and returns to Step S600 to repeat the processes of and after Step S600 (Step S620). The normal weak field control in Step S620 adjusts a weak field current (d-axis current) so as to make the post-boost voltage VH to be supplied to the inverters 41 and 42 become higher than the induced voltages generated in the motors MG1 and MG2 in accordance with a predetermined condition as necessary, and is mainly executed when the rectangular-wave control mode is used in the boost region. On the other hand, when determined that the engine start flag Fes is value 1 at Step S610, the CPU determines whether or not the modulation factor Kmd1 of the inverter 41 input at Step S600 is equal to or less than the threshold value Ksi that is the maximum value of the modulation factor in the sine-wave PWM control mode or the value smaller than the maximum value in some degree (Step S630). When the modulation factor Kmd1 is equal to or less than the threshold value Ksi, the CPU sets the control mode flag Fmod1 to value 0 so that the inverter 41 is controlled by the sine-wave PWM control mode (Step S640). When determined that the modulation factor Kmd1 is more than the threshold value Ksi at Step s630, the process of Steps S640 is skipped. After the process of Step S630 or S640, the CPU determines whether or not the modulation factor Kmd2 of the inverter 42 input at Step S600 is equal to or less than the threshold value Ksi (Step S650). When the modulation factor Kmd2 is equal to or less than the threshold value Ksi, the CPU sets the control mode flag Fmod2 to value 0 so that the inverter 42 is controlled by the sine-wave PWM control mode (Step S660). When determined that the modulation factor Kmd2 is more than the threshold value Ksi at Step s650, the process of Steps S660 is skipped. After the process of Steps S650 or S660, the CPU executes a weak field control for the start of the engine (Step s670) and returns to Step S600 to repeat the processes of and after Step S600. The "weak field control for the start of the engine" at Step s670 increases the weak field current (d-axis current) so as to advance a phase of the current in comparison with the normal weak field control.

According to the weak field control routine of FIG. 14, the inverters 41 and 42 are controlled while increasing the weak field current (Step S670) when the start of the engine 22 is demanded while the post-boosted voltage VH is not boosted with respect to the pre-boosted voltage VL in accordance with target post-boost voltage setting map and the inverters 41 and 42 are controlled by the overmodulation PWM control mode or the rectangular-wave control mode. Then, the inverters 41 and 42 are controlled by the sine-wave PWM control mode after a shift from the rectangular-wave control mode or the overmodulation PWM control mode to the sine-wave PWM control mode is allowed (Step S630-S660). Thus, the inverters 41 and 42 are basically controlled by the sine-wave PWM control mode superior in the control accuracy when the cranking of the engine 22 is executed, so that the vibration control with torque controls of the motors MG1 and MG2 is optimally performed, thereby reliably reducing the vibration generated when the engine 22 is started. The routine of FIG. 13 is preferably executed in concert with the routine of FIG. 14, so that the quick shift from the rectangular-wave control mode or the overmodulation PWM control mode to the sine-wave PWM control mode is allowed.

Figure 15:
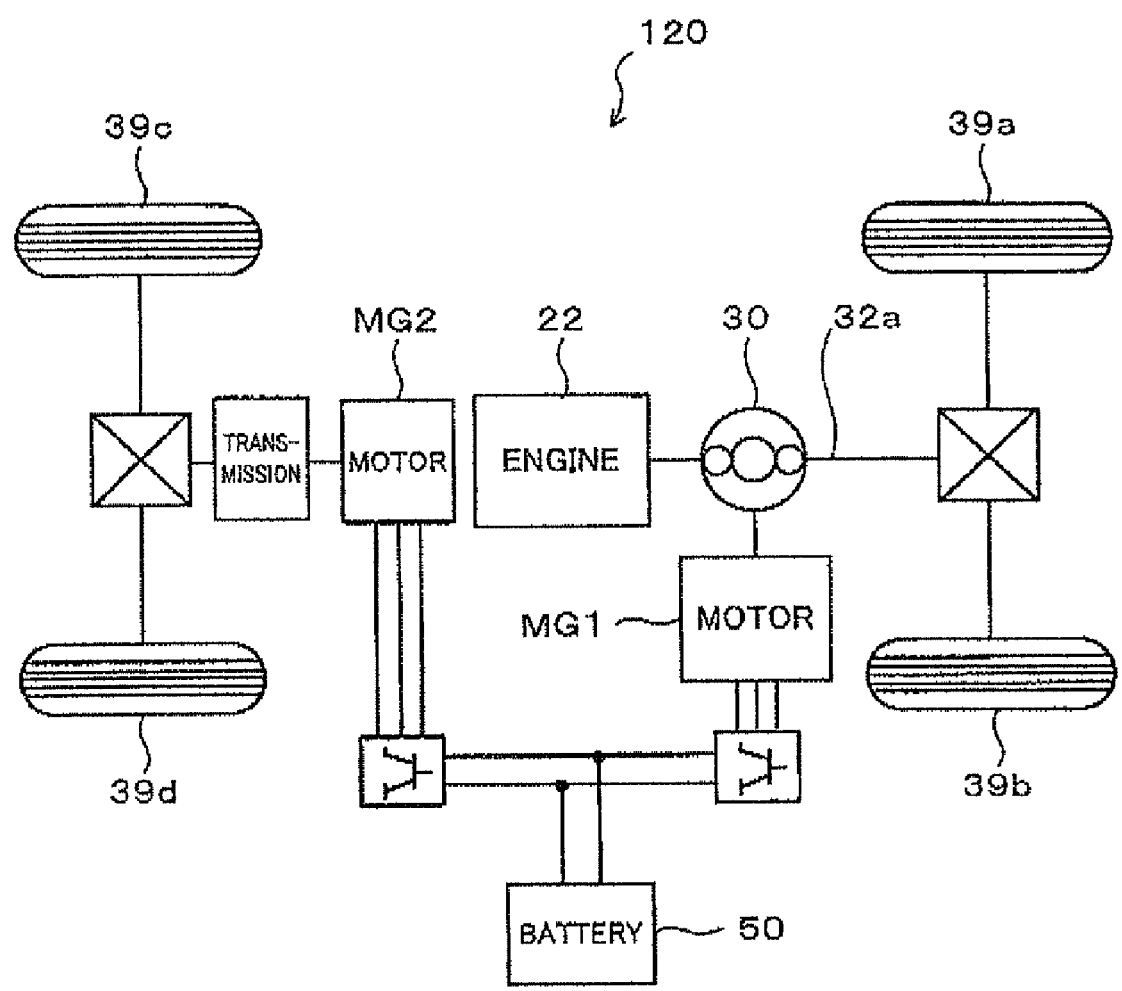
FIG. 15 is a schematic block diagram of a hybrid vehicle 120 according to a modification of the present invention.
Figure 16:
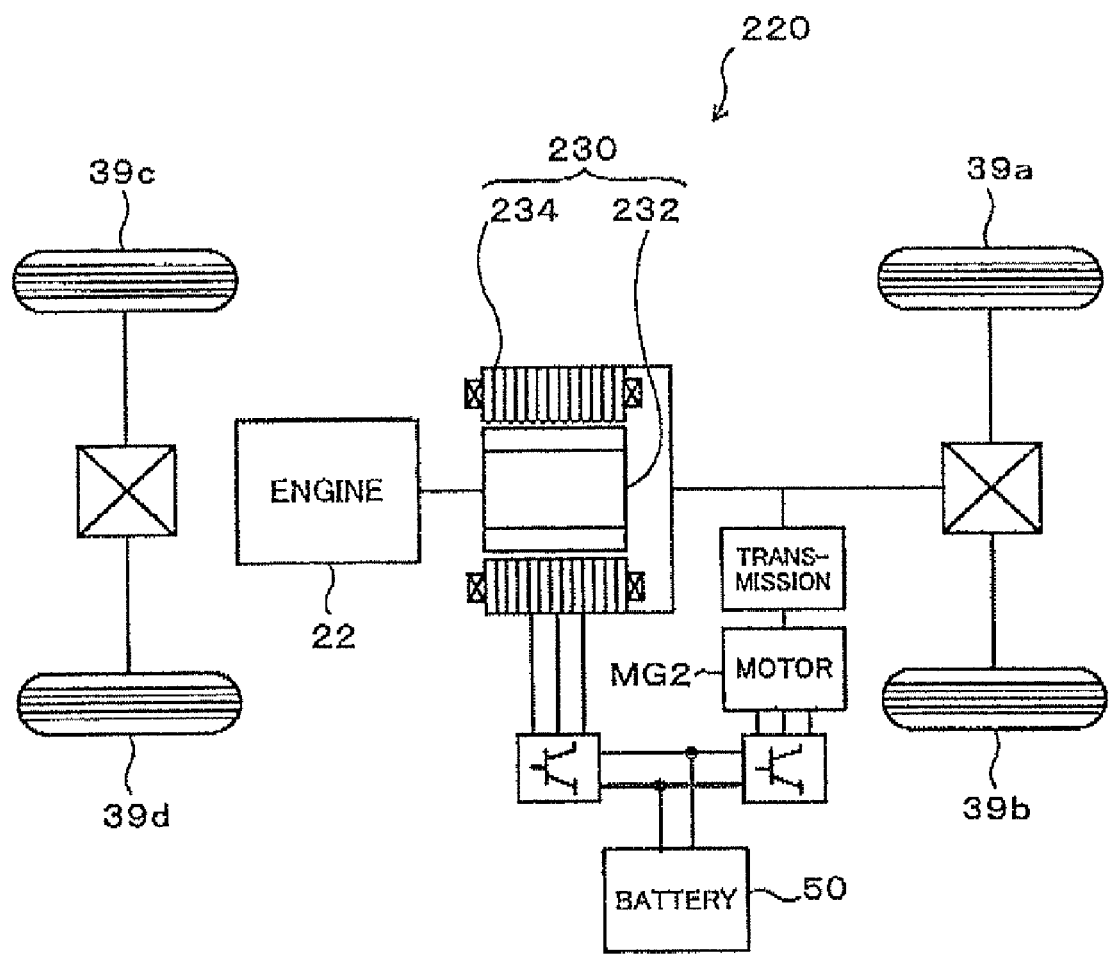
FIG. 16 is a schematic block diagram of a hybrid vehicle 220 according to a further modification of the present invention.

In the hybrid vehicle 20 of the embodiment, the ring gear shaft 32a is connected to the motor MG2 via the reduction gear 35 that reduces the rotational speed of the motor MG2 and transmits the reduced rotation speed to the ring gear shaft 32a. The reduction gear 35 may be replaced with a transmission that has two different speeds Hi and Lo or three or a greater number of different speeds and is designed to change the rotation speed of the motor MG2 and transmits the changed rotational speed to the ring gear shaft 32a. In the hybrid vehicle 20 of the embodiment, the power of the motor MG2 is subjected to speed reduction by the reduction gear 35 and is output to the ring gear shaft 32a. The technique of the invention is, however, not limited to the hybrid vehicle of this configuration but is also applicable to a hybrid vehicle 120 of a modified configuration shown in FIG. 15. In the hybrid vehicle 120 of FIG. 8, the power of the motor MG2 is output to another axle (an axle connected to wheels 39c and 39d) that is different from the axle connecting to the ring gear shaft 32a (the axle connected to the drive wheels 39a and 39b). The scope of the invention is not limited to the hybrid vehicle 20 of the embodiment that outputs the power from the engine 22 to the ring gear shaft 32a or the axle connected to the wheels 39a and 39b or the drive wheels through the power distribution and integration mechanism 30. As in the case of a hybrid vehicle 220 as a modification example shown in FIG. 16, the present invention may also be applied to a hybrid vehicle that includes a pair-rotor motor 230 that has an inner rotor 232 connected to the crankshaft of the engine 22, and an outer rotor 234 connected to the axle that outputs the power to the wheels 39a and 39b and that transmits a part of the power output from the engine 22 to the axle while converting the remainder of the power into electric power. The engine 22 is not limited to the internal combustion engine outputting power using the hydrocarbon fuel such as gasoline or light oil, but may be another engine such as a hydrogen engine. The motors MG1 and MG2 are not limited to the synchronous generator motor, but may be another motor such as an induction motor.

The correlation between the principal elements of the embodiment and modification examples, and the principal elements of the invention described in the "Disclosure of the Invention" section will now be described. That is, in the above described embodiment and modification examples, the battery 50 corresponds to "direct-current power source", the motors MG1 and MG2 correspond to the "motor", the inverters 41 and 42 correspond to "motor drive circuit", the boost converter 55 correspond to "voltage converter", the motor ECU 40 executing the routine of FIG. 3 corresponds to "voltage control module", and the motor ECU 40 executing the routine of FIG. 7 to control the inverters 41 and 42 corresponds to "drive circuit control module". In any case, the correspondence between the main elements in the embodiment and the variant and the main elements in the invention described in "Disclosure of the Invention" do not limit the elements in the invention described in "Disclosure of the Invention" since the embodiment is an example for describing in detail the best mode for carrying out the invention described in "Disclosure of the Invention". Specifically, the embodiment is merely a detailed example of the invention described in "Disclosure of the Invention", and the invention described in "Disclosure of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The present invention can be used in a manufacturing industry or the like of the motor drive control apparatus and the vehicle therewith.

The invention claimed is:

1. A motor drive control apparatus configured to drive and control a motor using electric power from a direct-current power source, the motor drive control apparatus comprising:
a motor drive circuit configured to drive the motor using a voltage form a side of the direct-current power source;
a voltage converter capable of boosting a voltage on a side of the motor drive circuit with respect to the voltage on the side of the direct-current power source;
a voltage control module that controls the voltage converter so as to make the voltage on the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boost region, the non-boost region including a region in which a loss produced by driving the motor when not boosting the voltage on the side of the motor drive circuit becomes smaller than the loss produced when boosting the voltage on the side of the motor drive circuit, the boost region including a region in which the loss produced when boosting the voltage on the side of the motor drive circuit becomes smaller than the loss produced when not boosting the voltage on the side of the motor drive circuit; and
a drive circuit control module that controls the motor drive circuit so as to make the motor operate at the target operation point,
wherein the motor drive control apparatus includes a second boast restriction that defines a boost selection line defining a boundary between the non-boost region and the boost region to be on a low rotational speed side and a low torque side in comparison with the boost restriction, wherein the voltage control module controls the voltage converter so as to make the voltage on the side of the motor drive circuit become the target post-boost voltage corresponding to the target operation point of the motor in accordance with the second boost restriction if the target operation point of the motor is included in the boost region in the second boost restriction when a maximum torque line and the boost selection line cross each other while the voltage on the side of the motor drive circuit is not boosted with respect to the voltage on the side of the direct-current power source in accordance with the boost restriction, and wherein the maximum torque line defines a maximum torque obtained by driving the motor based on the voltage on the side of the motor drive circuit according to rotational speeds of the motor.

2. A motor drive control apparatus according to claim 1, wherein the loss produced by driving the motor is defined as a sum of losses occurs in the motor, the motor drive circuit, and the voltage converter when the motor is driven while the voltage on the side of the motor drive circuit is not boosted with respect to the voltage on the side of the direct-current power source by the voltage converter or while the voltage on the side of the motor drive circuit is boosted with respect to the voltage on the side of the direct-current power source by the voltage converter.

3. A motor drive control apparatus according to claim 1, wherein the boost restriction defines the target post-boost voltage based on an induced voltage at an operation point of the motor in the boost region for each of the operation points.

4. A motor drive control apparatus according to claim 1, wherein the boost restriction divides the boost region into a plurality of equal voltage regions and defines the target post-boost voltage for each of the equal voltage regions.

5. A motor drive control apparatus according to claim 1, wherein the motor drive control apparatus is capable of driving and controlling first and second motors as the motor, wherein the boost restriction is prepared for each of the first and second motors so as to define the target post-boost voltage for each of operation points, and wherein the voltage control module controls the voltage converter so as to make the voltage on the side of the motor drive circuit become a larger one of the target post-boost voltage corresponding the target operation point of the first motor and the target post-boost voltage corresponding the target operation point of the second motor.

6. A motor drive control apparatus configured to drive and control a motor using electric power from a direct-current power source, the motor drive control apparatus comprising:

a motor drive circuit configured to drive the motor using a voltage form a side of the direct-current power source voltage converter capable of boosting a voltage on a side of the motor drive circuit with respect to the voltage on the side of the direct-current power source;

a voltage control module that controls the voltage converter so as to make the voltage on the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boost region, the non-boost region including a region in which a loss produced by driving the motor when not boosting the voltage on the side of the motor drive circuit becomes smaller than the loss produced when boosting the voltage on the side of the motor drive circuit, the boost region including a region in which the loss produced when boosting the voltage on the side of the motor drive circuit becomes smaller than the loss produced when not boosting the voltage on the side of the motor drive circuit, the voltage control module controlling the voltage converter so as to make the voltage on the side of the motor drive circuit become a predetermined target post-boost voltage when a torque of the motor in a next target operation point is larger than a maximum torque obtained by driving the motor based on the voltage on the side of the motor drive circuit at a rotational speed in the next target operation point while the voltage on the side of the motor drive circuit is not boosted with respect to the voltage on the side of the direct-current power source in accordance with the boost restriction, the next target operation point being estimated based on a present target operation point and a last target operation point of the motor; and a drive circuit control module that controls the motor drive circuit so as to make the motor operate at the target operation point.

7. A motor drive control apparatus according to claim 6, wherein the loss produced by driving the motor is defined as a sum of losses occurs in the motor, the motor drive circuit, and the voltage converter when the motor is driven while the voltage on the side of the motor drive circuit is not boosted with respect to the voltage on the side of the direct-current power source by the voltage converter or while the voltage on the side of the motor drive circuit is boosted with respect to the voltage on the side of the direct-current power source by the voltage converter.

8. A motor drive control apparatus according to claim 6, wherein the boost restriction defines the target post-boost voltage based on an induced voltage at an operation point of the motor in the boost region for each of the operation points.

9. A motor drive control apparatus according to claim 6, wherein the boost restriction divides the boost region into a plurality of equal voltage regions and defines the target post-boost voltage for each of the equal voltage regions.

10. A motor drive control apparatus according to claim 8, wherein the motor drive control apparatus is capable of driving and controlling first and second motors as the motor, wherein the boost restriction is prepared for each of the first and second motors so as to define the target post-boost voltage for each of operation points, and wherein the voltage control module controls the voltage converter so as to make the voltage on the side of the motor drive circuit become a larger one of the target post-boost voltage corresponding the target operation point of the first motor and the target post-boost voltage corresponding the target operation point of the second motor.

11. A motor drive control apparatus according to claim 6, wherein the target operation point is defined by a present rotational speed of the motor and a torque command to the motor, and wherein the voltage control module controls the voltage converter so as to make the voltage on the side of the motor drive circuit become a predetermined target post-boost voltage when the torque command to the motor reaches a maximum torque obtained by driving the motor based on the voltage on the side of the motor drive circuit at the present rotational speed while the voltage on the side of the motor drive circuit is not boosted with respect to the voltage on the side of the direct-current power source in accordance with the boost restriction.

12. A motor drive control apparatus according to claim 6, wherein the target operation point is defined by a present rotational speed of the motor and a torque command to the motor, and wherein the voltage control module controls the voltage converter so as to make the voltage on the side of the motor drive circuit become a predetermined target post-boost voltage when the torque command to the motor reaches a maximum torque obtained by driving the motor based on an inter-terminal voltage of the direct-current power source at the present rotational seed while the voltage on the side of the motor drive circuit is not boosted with respect to the voltage on the side of the direct-current power source in accordance with the boost restriction.

13. A motor drive control method to drive and control a motor using electric power from a direct-current power source, the method using a motor drive circuit configured to drive the motor using a voltage form a side of the direct-current power source, and a voltage converter capable of boosting a voltage on a side of the motor drive circuit with respect to the voltage on the side of the direct-current power source, the method comprising the step of:

(a) controlling the voltage converter so as to make the voltage on the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boost region, the non-boost region including a region in which a loss produced by driving the motor when not boosting the voltage on the side of the motor drive circuit becomes smaller than the loss produced when boosting the voltage on the side of the motor drive circuit, and the boost region including a region in which the loss produced when boosting the voltage on the side of the motor drive circuit becomes smaller than the loss produced when not boosting the voltage on the side of the motor drive circuit, wherein the step (a) controls the voltage converter so as to make the voltage on the side of the motor drive circuit become the target most-boost voltage corresponding to the target operation point of the motor in accordance with a second boost restriction if the target operation point of the motor is included in the boost region in the second boost restriction when a maximum torque line and the boost selection line cross each other while the voltage on the side of the motor drive circuit is not boosted with respect to the voltage on the side of the direct-current power source in accordance with the boost restriction, wherein the maximum torque line defines a maximum torque obtained by driving the motor based on the voltage on the side of the motor drive circuit according to rotational speeds of the motor, and wherein the second boost restriction defines a boost selection line defining a boundary between the non-boost region and the boost region to be on a low rotational speed side and a low torque side in comparison with the boost restriction.

14. A motor drive control method to drive and control a motor using electric power from a direct-current power source, the method using a motor drive circuit configured to drive the motor using a voltage form a side of the direct-current power source, and a voltage converter capable of boosting a voltage on a side of the motor drive circuit with respect to the voltage on the side of the direct-current power source, the method comprising the step of:

controlling the voltage converter so as to make the voltage on the side of the motor drive circuit become a target post-boost voltage that is a target value corresponding to a target operation point of the motor in accordance with a predetermined boost restriction when the target operation point of the motor is included in a boost region, the boost restriction dividing an operation region of the motor into a non-boost region and the boost region, the non-boost region including a region in which a loss produced by driving the motor when not boosting the voltage on the side of the motor drive circuit become smaller than the loss produced when boosting the voltage on the side of the motor drive circuit, and the boost region including a region in which the loss produced when boosting the voltage on the side of the motor drive circuit becomes smaller than the loss produced when not boosting the voltage on the side of the motor drive circuit, the controlling step controlling the voltage converter so as to make the voltage on the side of the motor drive circuit become a predetermined target, post-boost voltage when a torque of the motor in a next target operation point is larger than a maximum torque obtained by driving the motor based on the voltage on the side of the motor drive circuit at a rotational seed in the next target operation point while the voltage on the side of the motor drive circuit is not boosted with respect to the voltage on the side of the direct-current power source in accordance with the boost restriction, the next target operation point being estimated based on a present target operation point and a last target operation point of the motor.

* * * * *